(12) United States Patent
Bowers et al.

(10) Patent No.: US 9,413,396 B2
(45) Date of Patent: *Aug. 9, 2016

(54) STORAGE CONTAINER INCLUDING MULTI-LAYER INSULATION COMPOSITE MATERIAL HAVING BANDGAP MATERIAL

(71) Applicant: TOKITAE LLC, Bellevue, WA (US)

(72) Inventors: Jeffrey A. Bowers, Bellevue, WA (US); Roderick A. Hyde, Redmond, WA (US); Muriel Y. Ishikawa, Livermore, CA (US); Edward K. Y. Jung, Las Vegas, NV (US); Jordin T. Kare, Seattle, WA (US); Eric C. Leuthardt, St. Louis, MO (US); Nathan P. Myhrvold, Bellevue, WA (US); Thomas J. Nugent, Jr., Bellevue, WA (US); Clarence T. Tegreene, Mercer Island, WA (US); Charles Whitmer, North Bend, WA (US); Lowell L. Wood, Jr., Bellevue, WA (US)

(73) Assignee: TOKITAE LLC, Bellevue, WA (US)

( * ) Notice: Subject to any disclaimer, the term of this patent is extended or adjusted under 35 U.S.C. 154(b) by 117 days.

This patent is subject to a terminal disclaimer.

(21) Appl. No.: 13/907,470

(22) Filed: May 31, 2013

(65) Prior Publication Data
US 2013/0265145 A1  Oct. 10, 2013

Related U.S. Application Data

(62) Division of application No. 12/152,465, filed on May 13, 2008, now Pat. No. 8,485,387.

(51) Int. Cl.
*F17C 1/02* (2006.01)
*H04Q 5/22* (2006.01)
(Continued)

(52) U.S. Cl.
CPC .............. *H04B 1/02* (2013.01); *B65D 81/3823* (2013.01); *B65D 81/3834* (2013.01);
(Continued)

(58) Field of Classification Search
USPC .......... 340/636.18, 588, 449, 870.17, 870.16, 340/572.1, 8.1; 455/41.1, 41.2, 562.1, 455/575.1, 575.7, 272, 558
See application file for complete search history.

(56) References Cited

U.S. PATENT DOCUMENTS 520,584 A    5/1894  Turner
1,903,171 A  3/1933  Cordrey
(Continued)

FOREIGN PATENT DOCUMENTS

CN    2414742      1/2001
CN    2460457 Y    11/2001
(Continued)

OTHER PUBLICATIONS

U.S. Appl. No. 14/098,886, Bloedow et al.
(Continued)

Primary Examiner — Fekadeselassie Girma
(74) Attorney, Agent, or Firm — Dorsey & Whitney LLP

(57) ABSTRACT

In one embodiment, a storage container includes a container structure defining at least one storage chamber. The container structure includes multi-layer insulation (MLI) composite material having at least one thermally-reflective layer. The at least one thermally-reflective layer includes bandgap material that is transmissive to radio-frequency electromagnetic radiation.

28 Claims, 12 Drawing Sheets

(51) Int. Cl.
| | |
|---|---|
| *B29D 22/00* | (2006.01) |
| *H04B 1/02* | (2006.01) |
| *B65D 81/38* | (2006.01) |
| *G08C 17/02* | (2006.01) |
| *H04B 1/06* | (2006.01) |

(52) U.S. Cl.
CPC ....... *B65D 81/3846* (2013.01); *B65D 81/3874* (2013.01); *G08C 17/02* (2013.01); *H04B 1/06* (2013.01); *Y10T 428/1376* (2015.01)

(56) References Cited

U.S. PATENT DOCUMENTS

| | | | |
|---|---|---|---|
| 2,161,295 A | 6/1939 | Hirschberg | |
| 2,496,296 A | 2/1950 | Lobl | |
| 2,717,937 A | 9/1955 | Lehr et al. | |
| 2,967,152 A | 1/1961 | Matsch et al. | |
| 3,029,967 A | 4/1962 | Morrison | |
| 3,034,845 A | 5/1962 | Haumann | |
| 3,069,045 A | 12/1962 | Naumann et al. | |
| 3,108,840 A | 10/1963 | Conrad et al. | |
| 3,238,002 A | 3/1966 | O'Connell et al. | |
| 3,921,844 A | 11/1975 | Walles | |
| 4,034,129 A | 7/1977 | Kittle | |
| 4,094,127 A | 6/1978 | Romagnoli | |
| 4,154,363 A | 5/1979 | Barthel | |
| 4,184,601 A | 1/1980 | Stewart et al. | |
| 4,312,669 A | 1/1982 | Boffito et al. | |
| 4,318,058 A * | 3/1982 | Mito et al. | 372/50.12 |
| 4,358,490 A | 11/1982 | Nagai | |
| 4,388,051 A | 6/1983 | Dresler et al. | |
| 4,402,927 A | 9/1983 | von Dardel et al. | |
| 4,481,779 A | 11/1984 | Barthel | |
| 4,481,792 A | 11/1984 | Groeger et al. | |
| 4,521,800 A * | 6/1985 | Howe | 257/755 |
| 4,526,015 A | 7/1985 | Laskaris | |
| 4,616,752 A | 10/1986 | Ridgley | |
| 4,640,574 A * | 2/1987 | Unger | 385/14 |
| 4,726,974 A | 2/1988 | Nowobilski et al. | |
| 4,766,471 A * | 8/1988 | Ovshinsky et al. | 257/53 |
| 4,796,432 A | 1/1989 | Fixsen et al. | |
| 4,855,950 A * | 8/1989 | Takada | 365/113 |
| 4,920,387 A * | 4/1990 | Takasu et al. | 257/13 |
| 4,951,014 A * | 8/1990 | Wohlert et al. | 333/246 |
| 4,955,204 A | 9/1990 | Pehl et al. | |
| 4,956,976 A | 9/1990 | Kral et al. | |
| 4,969,336 A | 11/1990 | Knippscheer et al. | |
| 4,974,423 A | 12/1990 | Pring | |
| 5,012,102 A | 4/1991 | Gowlett | |
| 5,103,337 A | 4/1992 | Schrenk et al. | |
| 5,116,105 A | 5/1992 | Hong | |
| 5,187,116 A * | 2/1993 | Kitagawa et al. | 438/22 |
| 5,277,031 A | 1/1994 | Miller et al. | |
| 5,277,959 A | 1/1994 | Kourtides et al. | |
| 5,302,840 A * | 4/1994 | Takikawa | 257/194 |
| 5,330,816 A | 7/1994 | Rusek, Jr. | |
| 5,355,684 A | 10/1994 | Guice | |
| 5,359,890 A * | 11/1994 | Fulton | G01C 23/005 340/973 |
| 5,376,184 A | 12/1994 | Aspden | |
| 5,452,565 A | 9/1995 | Blom et al. | |
| 5,505,046 A | 4/1996 | Nelson et al. | |
| 5,548,116 A | 8/1996 | Pandelisev | |
| 5,563,182 A | 10/1996 | Epstein et al. | |
| 5,573,133 A | 11/1996 | Park | |
| 5,579,830 A | 12/1996 | Giammaruti | |
| 5,580,522 A | 12/1996 | Leonard et al. | |
| 5,590,054 A | 12/1996 | McIntosh | |
| 5,633,077 A | 5/1997 | Olinger | |
| 5,671,856 A | 9/1997 | Lisch | |
| 5,782,344 A | 7/1998 | Edwards et al. | |
| 5,800,905 A | 9/1998 | Sheridan et al. | |
| 5,821,762 A * | 10/1998 | Hamaguchi et al. | 324/750.03 |
| 5,829,594 A | 11/1998 | Warder | |
| 5,831,489 A * | 11/1998 | Wire | H05K 9/0075 174/377 |
| 5,846,224 A | 12/1998 | Sword et al. | |
| 5,846,883 A * | 12/1998 | Moslehi | 438/711 |
| 5,857,778 A | 1/1999 | Ells | |
| 5,934,099 A | 8/1999 | Cook et al. | |
| 6,030,580 A | 2/2000 | Raasch et al. | |
| 6,196,296 B1 | 3/2001 | Wisniewski et al. | |
| 6,209,343 B1 | 4/2001 | Owen | |
| 6,212,904 B1 | 4/2001 | Arkharov et al. | |
| 6,213,339 B1 | 4/2001 | Lee | |
| 6,234,341 B1 | 5/2001 | Tattam | |
| 6,260,613 B1 | 7/2001 | Pollard, II | |
| 6,272,679 B1 | 8/2001 | Norin | |
| 6,287,652 B2 | 9/2001 | Speckhals et al. | |
| 6,337,052 B1 | 1/2002 | Rosenwasser | |
| 6,438,992 B1 | 8/2002 | Smith et al. | |
| 6,439,406 B1 | 8/2002 | Duhon | |
| 6,465,366 B1 * | 10/2002 | Nemani et al. | 438/778 |
| 6,467,642 B2 | 10/2002 | Mullens et al. | |
| 6,485,805 B1 | 11/2002 | Smith et al. | |
| 6,521,077 B1 | 2/2003 | McGivern et al. | |
| 6,571,971 B1 | 6/2003 | Weiler | |
| 6,584,797 B1 | 7/2003 | Smith et al. | |
| 6,624,349 B1 | 9/2003 | Bass | |
| 6,673,594 B1 | 1/2004 | Owen et al. | |
| 6,688,132 B2 | 2/2004 | Smith et al. | |
| 6,692,695 B1 | 2/2004 | Bronshtein et al. | |
| 6,701,724 B2 | 3/2004 | Smith et al. | |
| 6,742,650 B2 | 6/2004 | Yang et al. | |
| 6,742,673 B2 | 6/2004 | Credle, Jr. et al. | |
| 6,751,963 B2 | 6/2004 | Navedo et al. | |
| 6,771,183 B2 | 8/2004 | Hunter | |
| 6,806,808 B1 * | 10/2004 | Watters et al. | 340/10.41 |
| 6,808,011 B2 | 10/2004 | Lindemuth et al. | |
| 6,841,917 B2 | 1/2005 | Potter | |
| 6,877,504 B2 | 4/2005 | Schreff et al. | |
| 6,967,051 B1 | 11/2005 | Augustynowicz et al. | |
| 6,997,241 B2 | 2/2006 | Chou et al. | |
| 7,038,585 B2 | 5/2006 | Hall et al. | |
| 7,128,807 B2 | 10/2006 | Mörschner et al. | |
| 7,240,513 B1 | 7/2007 | Conforti | |
| 7,258,247 B2 | 8/2007 | Marquez | |
| 7,267,795 B2 | 9/2007 | Ammann et al. | |
| 7,278,278 B2 | 10/2007 | Wowk et al. | |
| 7,596,957 B2 | 10/2009 | Fuhr et al. | |
| 7,789,258 B1 | 9/2010 | Anderson | |
| 7,807,242 B2 | 10/2010 | Soerensen et al. | |
| 8,074,271 B2 * | 12/2011 | Davis et al. | 726/16 |
| 8,138,913 B2 * | 3/2012 | Nagel et al. | 340/539.13 |
| 8,174,369 B2 * | 5/2012 | Jones et al. | 340/10.52 |
| 8,211,516 B2 * | 7/2012 | Bowers | B65D 81/3823 428/34.1 |
| 8,485,387 B2 * | 7/2013 | Bowers | B65D 81/3823 220/592.03 |
| 2002/0050514 A1 | 5/2002 | Schein | |
| 2002/0083717 A1 | 7/2002 | Mullens et al. | |
| 2002/0084235 A1 | 7/2002 | Lake | |
| 2002/0130131 A1 | 9/2002 | Zucker et al. | |
| 2002/0155699 A1 * | 10/2002 | Ueda | 438/637 |
| 2003/0072687 A1 | 4/2003 | Nehring et al. | |
| 2003/0148773 A1 | 8/2003 | Spriestersbach et al. | |
| 2003/0160059 A1 | 8/2003 | Credle, Jr. et al. | |
| 2004/0035120 A1 | 2/2004 | Brunnhofer | |
| 2004/0055313 A1 | 3/2004 | Navedo et al. | |
| 2004/0055600 A1 | 3/2004 | Izuchukwu | |
| 2004/0103302 A1 | 5/2004 | Yoshimura et al. | |
| 2004/0113790 A1 * | 6/2004 | Hamel | G06K 19/0723 340/572.1 |
| 2004/0145533 A1 * | 7/2004 | Taubman | 343/841 |
| 2005/0009192 A1 | 1/2005 | Page | |
| 2005/0029149 A1 * | 2/2005 | Leung et al. | 206/524.8 |
| 2005/0053345 A1 * | 3/2005 | Bayindir et al. | 385/123 |
| 2005/0067441 A1 | 3/2005 | Alley | |
| 2005/0143787 A1 | 6/2005 | Boveja et al. | |
| 2005/0247312 A1 | 11/2005 | Davies | |
| 2005/0255261 A1 * | 11/2005 | Nomula | 428/34.2 |
| 2005/0274378 A1 | 12/2005 | Bonney et al. | |
| 2006/0021355 A1 | 2/2006 | Boesel et al. | |

(56) References Cited

U.S. PATENT DOCUMENTS

| | | | |
|---|---|---|---|
| 2006/0071585 A1 | 4/2006 | Wang | |
| 2006/0086808 A1* | 4/2006 | Appalucci | B65D 25/205 235/492 |
| 2006/0150662 A1* | 7/2006 | Lee et al. | 62/441 |
| 2006/0187026 A1* | 8/2006 | Kochis | 340/539.13 |
| 2006/0191282 A1 | 8/2006 | Sekiya et al. | |
| 2006/0196876 A1 | 9/2006 | Rohwer | |
| 2006/0220978 A1* | 10/2006 | Atchiriki | H01Q 9/16 343/878 |
| 2006/0259188 A1 | 11/2006 | Berg | |
| 2006/0280007 A1* | 12/2006 | Ito et al. | 365/192 |
| 2007/0041814 A1 | 2/2007 | Lowe | |
| 2007/0046559 A1* | 3/2007 | Youn | G06K 19/0723 343/862 |
| 2007/0210090 A1 | 9/2007 | Sixt et al. | |
| 2008/0012577 A1* | 1/2008 | Potyrailo et al. | 324/633 |
| 2008/0022698 A1 | 1/2008 | Hobbs et al. | |
| 2008/0060215 A1 | 3/2008 | Reilly et al. | |
| 2008/0129511 A1* | 6/2008 | Yuen et al. | 340/572.7 |
| 2008/0186139 A1 | 8/2008 | Butler et al. | |
| 2008/0231453 A1* | 9/2008 | Corder | G06Q 10/08 340/572.1 |
| 2008/0233391 A1 | 9/2008 | Sterzel et al. | |
| 2008/0269676 A1 | 10/2008 | Bieberich et al. | |
| 2008/0297346 A1* | 12/2008 | Brackmann et al. | 340/572.1 |
| 2009/0275478 A1 | 11/2009 | Atkins et al. | |
| 2009/0301125 A1 | 12/2009 | Myles et al. | |
| 2009/0309733 A1* | 12/2009 | Moran et al. | 340/572.1 |
| 2010/0016168 A1 | 1/2010 | Atkins et al. | |
| 2010/0028214 A1 | 2/2010 | Howard et al. | |
| 2010/0213200 A1 | 8/2010 | Deane et al. | |
| 2010/0265068 A1* | 10/2010 | Brackmann et al. | 340/572.1 |
| 2010/0287963 A1 | 11/2010 | Billen et al. | |
| 2011/0100605 A1 | 5/2011 | Zheng et al. | |
| 2011/0117538 A1 | 5/2011 | Niazi | |
| 2011/0127273 A1 | 6/2011 | Deane et al. | |
| 2011/0155745 A1 | 6/2011 | Chou et al. | |
| 2011/0248825 A1* | 10/2011 | Hamel | H04Q 9/00 340/10.1 |
| 2011/0297306 A1* | 12/2011 | Yang | 156/242 |
| 2011/0308201 A1 | 12/2011 | Hyde et al. | |
| 2012/0000918 A1 | 1/2012 | Deane et al. | |
| 2012/0085070 A1 | 4/2012 | Chou et al. | |
| 2012/0097686 A1 | 4/2012 | Hyde et al. | |
| 2012/0168448 A1 | 7/2012 | Hyde et al. | |
| 2012/0168645 A1* | 7/2012 | Atzmony et al. | 250/492.1 |
| 2012/0240524 A1 | 9/2012 | Bowers et al. | |

FOREIGN PATENT DOCUMENTS

| | | |
|---|---|---|
| CN | 1496537 A | 5/2004 |
| CN | 1756912 A | 4/2006 |
| CN | 1827486 A | 9/2006 |
| CN | 101073524 A | 11/2007 |
| FR | 2 621 685 | 10/1987 |
| GB | 2 441 636 A | 3/2008 |
| WO | WO 94/15034 | 7/1994 |
| WO | WO 99/036725 A1 | 7/1999 |
| WO | WO 2005/084353 A2 | 9/2005 |
| WO | WO 2007/039553 A2 | 4/2007 |

OTHER PUBLICATIONS

U.S. Appl. No. 14/070,892, Hyde et al.
U.S. Appl. No. 14/070,234, Hyde et al.
U.S. Appl. No. 13/853,245, Eckhoff et al.
Intellectual Property Office of the People's Republic of China; Office Action; Chinese Application No. 200880119918.0; Dec. 12, 2012; pp. 1-11.
Chinese State Intellectual Property Office; Chinese Office Action; App. No. 200880119777.2; Jan. 7, 2013 (received by our agent on Jan. 9, 2013); pp. 1-12; No English Translation Provided.
Chen, Dexiang, et al.; "Opportunities and challenges of developing thermostable vaccines"; Expert Reviews Vaccines; 2009; pp. 547-557; vol. 8, No. 5; Expert Reviews Ltd.
Greenbox Systems; "Thermal Management System"; 2010; Printed on: Feb. 3, 2011; p. 1 of 1; located at http://www.greenboxsystems.com.
Matthias, Dipika M., et al.; "Freezing temperatures in the vaccine cold chain: A systematic literature review"; Vaccine; 2007; pp. 3980-3986; vol. 25; Elsevier Ltd.
Pure Temp; "Technology"; Printed on: Feb. 9, 2011; p. 1-3; located at http://puretemp.com/technology.html.
Spur Industries Inc.; "The Only Way to Get Them Apart is to Melt Them Apart"; 2006; printed on Feb. 8, 2011; pp. 1-3; located at http://www.spurind.com/applications.php.
Williams, Preston; "Greenbox Thermal Management System Refrigerate-able 2 to 8 C Shipping Containers"; Printed on: Feb. 9, 2011; p. 1; located at http://www.puretemp.com/documents/Refrigerate-able%202%20to%208%20C%20Shipping%20Containers.pdf.
Wirkas, Theo, et al.; "A vaccine cold chain freezing study in PNG highlights technology needs for hot climate countries"; Vaccine; 2007; pp. 691-697; vol. 25; Elsevier Ltd.
World Health Organization; "Preventing Freeze Damage to Vaccines: Aide-memoire for prevention of freeze damage to vaccines"; 2007; printed on Feb. 8, 2011; pp. 1-4; WHO/IVB/07.09; World Health Organization.
World Health Organization; "Temperature sensitivity of vaccines"; Department of Immunization, Vaccines and Biologicals, World Health Organization; Aug. 2006; pp. 1-62 plus cover sheet, pp. i-ix, and end sheet (73 pages total); WHO/IVB/06.10; World Health Organization.
PCT International Search Report; Application No. PCT/US2011/001939; Mar. 27, 2012; pp. 1-2.
Chinese State Intellectual Property Office; App. No. 200880119777.2; Mar. 30, 2012; pp. 1-10 (no translation available).
Adams, R. O.; "A review of the stainless steel surface"; The Journal of Vacuum Science and Technology A; Bearing a date of Jan.-Mar. 1983; pp. 12-18; vol. 1, No. 1; American Vacuum Society.
Bartl, J., et al.; "Emissivity of aluminium and its importance for radiometric measurement"; Measurement Science Review; Bearing a date of 2004; pp. 31-36; vol. 4, Section 3.
Beavis, L. C.; "Interaction of Hydrogen with the Surface of Type 304 Stainless Steel"; The Journal of Vacuum Science and Technology; Bearing a date of Mar.-Apr. 1973; pp. 386-390; vol. 10, No. 2; American Vacuum Society.
Benvenuti, C., et al.; "Pumping characteristics of the St707 nonevaporable getter (Zr 70 V 24.6-Fe 5.4 wt %)"; The Journal of Vacuum Science and Technology A; Bearing a date of Nov.-Dec. 1996; pp. 3278-3282; vol. 14, No. 6; American Vacuum Society.
Demko, J. A., et al.; "Design Tool for Cryogenic Thermal Insulation Systems"; Advances in Cryogenic Engineering: Transactions of the Cryogenic Engineering Conference-CEC; Bearing a date of 2008; pp. 145-151; vol. 53; American Institute of Physics.
Hedayat, A., et al.; "Variable Density Multilayer Insulation for Cryogenic Storage"; Contract NAS8-40836; 36th Joint Propulsion Conference; Bearing a date of Jul. 17-19, 2000; pp. 1-10.
Horgan, A. M., et al.; "Hydrogen and Nitrogen Desorption Phenomena Associated with a Stainless Steel 304 Low Energy Electron Diffraction (LEED) and Molecular Beam Assembly"; The Journal of Vacuum Science and Technology; Bearing a date of Jul.-Aug. 1972; pp. 1218-1226; vol. 9, No. 4.
Keller, C. W., et al.; "Thermal Performance of Multilayer Insulations, Final Report, Contract NAS 3-14377"; Bearing a date of Apr. 5, 1974; pp. 1-446.
Kishiyama, K., et al.; "Measurement of Ultra Low Outgassing Rates for NLC UHV Vacuum Chambers"; Proceedings of the 2001 Particle Accelerator Conference, Chicago; Bearing a date of 2001; pp. 2195-2197; IEEE.
Little, Arthur D.; "Liquid Propellant Losses During Space Flight, Final Report on Contract No. NASw-615"; Bearing a date of Oct. 1964; pp. 1-315.
Lockheed Missiles & Space Company; "High-Performance Thermal Protection Systems, Contract NAS 8-20758, vol. II"; Bearing a date of Dec. 31, 1969; pp. 1-117.

(56) References Cited

OTHER PUBLICATIONS

Nemanič, Vincenc, et al.; "Experiments with a thin-walled stainless-steel vacuum chamber"; The Journal of Vacuum Science and Technology A; Bearing a date of Jul.-Aug. 2000; pp. 1789-1793; vol. 18, No. 4; American Vacuum Society.
Nemanič, Vincenc, et al.; "Outgassing of a thin wall vacuum insulating panel"; Vacuum; Bearing a date of 1998; pp. 233-237; vol. 49, No. 3; Elsevier Science Ltd.
Nemanič, Vincenc, et al.; "A study of thermal treatment procedures to reduce hydrogen outgassing rate in thin wall stainless steel cells"; Vacuum; Bearing a date of 1999; pp. 277-280; vol. 53; Elsevier Science Ltd.
PCT International Search Report; International App. No. PCT/US 09/01715; Jan. 8, 2010; pp. 1-2.
Sasaki, Y. Tito; "A survey of vacuum material cleaning procedures: A subcommittee report of the American Vacuum Society Recommended Practices Committee"; The Journal of Vacuum Science and Technology A; Bearing a date of May-Jun. 1991; pp. 2025-2035; vol. 9, No. 3; American Vacuum Society.
U.S. Department of Health and Human Services, Centers for Disease Control and Prevention; "Recommended Immunization Schedule for Persons Aged 0 Through 6 Years—United States"; Bearing a date of 2009; p. 1.
Vesel, Alenka, et al.; "Oxidation of AISI 304L stainless steel surface with atomic oxygen"; Applied Surface Science; Bearing a date of 2002; pp. 94-103; vol. 200; Elsevier Science B.V.
Young, J. R.; "Outgassing Characteristics of Stainless Steel and Aluminum with Different Surface Treatments"; The Journal of Vacuum Science and Technology; Bearing a date of Oct. 14, 1968; pp. 398-400; vol. 6, No. 3.
Zajec, Bojan, et al.; "Hydrogen bulk states in stainless-steel related to hydrogen release kinetics and associated redistribution phenomena"; Vacuum; Bearing a date of 2001; pp. 447-452; vol. 61; Elsevier Science Ltd.
Bapat, S. L. et al.; "Experimental investigations of multilayer insulation"; Cryogenics; Bearing a date of Aug. 1990; pp. 711-719; vol. 30.
Bapat, S. L. et al.; "Performance prediction of multilayer insulation"; Cryogenics; Bearing a date of Aug. 1990; pp. 700-710; vol. 30.
Barth, W. et al.; "Experimental investigations of superinsulation models equipped with carbon paper"; Cryogenics; Bearing a date of May 1988; pp. 317-320; vol. 28.
Barth, W. et al.; "Test results for a high quality industrial superinsulation"; Cryogenics; Bearing a date of Sep. 1988; pp. 607-609; vol. 28.
Benvenuti, C. et al.; "Obtention of pressures in the $10^{-14}$ torrrange by means of a Zr V Fe non evaporable getter"; Vacuum; Bearing a date of 1993; pp. 511-513; vol. 44; No. 5-7; Pergamon Press Ltd.
Benvenuti, C.; "Decreasing surface outgassing by thin film getter coatings"; Vacuum; Bearing a date of 1998; pp. 57-63; vol. 50; No. 1-2; Elsevier Science Ltd.
Benvenuti, C.; "Nonevaporable getter films for ultrahigh vacuum applications"; Journal of Vacuum Science Technology A Vacuum Surfaces, and Films; Bearing a date of Jan./Feb. 1998; pp. 148-154; vol. 16; No. 1; American Chemical Society.
Berman, A.; "Water vapor in vacuum systems"; Vacuum; Bearing a date of 1996; pp. 327-332; vol. 47; No. 4; Elsevier Science Ltd.
Bernardini, M. et al.; "Air bake-out to reduce hydrogen outgassing from stainless steel"; Journal of Vacuum Science Technology; Bearing a date of Jan./Feb. 1998; pp. 188-193; vol. 16; No. 1; American Chemical Society.
Bo, H. et al.; "Tetradecane and hexadecane binary mixtures as phase change materials (PCMs) for cool storage in district cooling systems"; Energy; Bearing a date of 1999; vol. 24; pp. 1015-1028; Elsevier Science Ltd.
Boffito, C. et al.; "A nonevaporable low temperature activatable getter material"; Journal of Vacuum Science Technology; Bearing a date of Apr. 1981; pp. 1117-1120; vol. 18; No. 3; American Vacuum Society.
Brown, R.D.; "Outgassing of epoxy resins in vacumm."; Vacuum; Bearing a date of 1967; pp. 25-28; vol. 17; No. 9; Pergamon Press Ltd.
Burns, H. D.; "Outgassing Test for Non-metallic Materials Associated with Sensitive Optical Surfaces in a Space Environment"; MSFC-SPEC-1443; Bearing a date of Oct. 1987; pp. 1-10.
Chen, G. et al.; "Performance of multilayer insulation with slotted shield"; Cryogenics ICEC Supplement; Bearing a date of 1994; pp. 381-384; vol. 34.
Chen, J. R. et al.; "An aluminum vacuum chamber for the bending magnet of the SRRC synchrotron light source"; Vacuum; Bearing a date of 1990; pp. 2079-2081; vol. 41; No. 7-9; Pergamon Press PLC.
Chen, J. R. et al.; "Outgassing behavior of A6063-Ex aluminum alloy and SUS 304 stainless steel"; Journal of Vacuum Science Technology; Bearing a date of Nov./Dec. 1987; pp. 3422-3424; vol. 5; No. 6; American Vacuum Society.
Chen, J. R. et al.; "Outgassing behavior on aluminum surfaces: Water in vacuum systems"; Journal of Vacuum Science Technology; Bearing a date of Jul./Aug. 1994; pp. 1750-1754; vol. 12; No. 4; American Vacuum Society.
Chen, J. R. et al.; "Thermal outgassing from aluminum alloy vacuum chambers"; Journal of Vacuum Science Technology; Bearing a date of Nov./Dec. 1985; pp. 2188-2191; vol. 3; No. 6; American Vacuum Society.
Chen, J. R.; "A comparison of outgassing rate of 304 stainless steel and A6063-EX aluminum alloy vacuum chamber after filling with water"; Journal of Vacuum Science Technology A Vacuum Surfaces and Film; Bearing a date of Mar. 1987; pp. 262-264; vol. 5; No. 2; American Chemical Society.
Chiggiato, P.; "Production of extreme high vacuum with non evaporable getters" Physica Scripta; Bearing a date of 1997; pp. 9-13; vol. T71.
Cho, B.; "Creation of extreme high vacuum with a turbomolecular pumping system: A baking approach"; Journal of Vacuum Science Technology; Bearing a date of Jul./Aug. 1995; pp. 2228-2232; vol. 13; No. 4; American Vacuum Society.
Choi, S. et al.; "Gas permeability of various graphite/epoxy composite laminates for cryogenic storage systems"; Composites Part B: Engineering; Bearing a date of 2008; pp. 782-791; vol. 39; Elsevier Science Ltd.
Chun, I. et al.; "Effect of the Cr-rich oxide surface on fast pumpdown to ultrahigh vacuum"; Journal of Vacuum Science Technology A Vacuum, Surfaces, and Films; Bearing a date of Sep./Oct. 1997; pp. 2518-2520; vol. 15; No. 5; American Vacuum Society.
Chun, I. et al.; "Outgassing rate characteristic of a stainless-steel extreme high vacuum system"; Journal of Vacuum Science Technology; Bearing a date of Jul./Aug. 1996; pp. 2636-2640; vol. 14; No. 4; American Vacuum Society.
Crawley, D J. et al.; "Degassing Characteristics of Some 'O' Ring Materials"; Vacuum; Bearing a date of 1963; pp. 7-9; vol. 14; Pergamon Press Ltd.
Csernatony, L.; "The Properties of Viton 'A' Elastomers II. The influence of permeation, diffusion and solubility of gases on the gas emission rate from an O-ring used as an atmospheric seal or high vacuum immersed"; Vacuum; Bearing a date of 1965; pp. 129-134; vol. 16; No. 3; Pergamon Press Ltd.
Day, C.; "The use of active carbons as cryosorbent"; Colloids and Surfaces A Physicochemical and Engineering Aspects; Bearing a date of 2001; pp. 187-206; vol. 187-188; Elsevier Science.
Della Porta, P.; "Gas problem and gettering in sealed-off vacuum devices"; Vacuum; Bearing a date of 1996; pp. 771-777; vol. 47; No. 6-8 Elsevier Science Ltd.
Dylla, H. F. et al.; "Correlation of outgassing of stainless steel and aluminum with various surface treatments"; Journal of Vacuum Science Technology; Bearing a date of Sep./Oct. 1993; pp. 2623-2636; vol. 11; No. 5; American Vacuum Society.
Elsey, R. J. "Outgassing of vacuum material I"; Vacuum; Bearing a date of 1975; pp. 299-306; vol. 25; No. 7; Pergamon Press Ltd.
Elsey, R. J. "Outgassing of vacuum materials II" Vacuum; Bearing a date of 1975; pp. 347-361; vol. 25; No. 8; Pergamon Press Ltd.
Engelmann, G. et al.; "Vacuum chambers in composite material"; Journal of Vacuum Science Technology; Bearing a date of Jul./Aug. 1987; pp. 2337-2341; vol. 5; No. 4; American Vacuum Society.

(56) References Cited

OTHER PUBLICATIONS

Eyssa, Y. M. et al.; "Thermodynamic optimization of thermal radiation shields for a cryogenic apparatus"; *Cryogenics*; Bearing a date of May 1978; pp. 305-307; vol. 18; IPC Business Press.
Glassford, A. P. M. et al.; "Outgassing rate of multilayer insulation"; *1978*; Bearing a date of 1978; pp. 83-106.
Gupta, A. K. et al.; "Outgassing from epoxy resins and methods for its reduction"; *Vacuum*; Bearing a date of 1977; pp. 61-63; vol. 27; No. 12; Pergamon Press Ltd.
HAŁACZEK, T. et al.; "Flat-plate cryostat for measurements of multilayer insulation thermal conductivity"; *Cryogenics*; Bearing a date of Oct. 1985; pp. 593-595; vol. 25; Butterworth & Co. Ltd.
HAŁACZEK, T. et al.; "Unguarded cryostat for thermal conductivity measurements of multilayer insulations"; *Cryogenics*; Bearing a date of Sep. 1985; pp. 529-530; vol. 25; Butterworth & Co. Ltd.
HAŁACZEK, T. L. et al.; "Heat transport in self-pumping multilayer insulation"; *Cryogenics*; Bearing a date of Jun. 1986; pp. 373-376; vol. 26; Butterworth & Co. Ltd.
HAŁACZEK, T. L. et al.; "Temperature variation of thermal conductivity of self-pumping multilayer insulation"; *Cryogenics*; Bearing a date of Oct. 1986; pp. 544-546.; vol. 26; Butterworth & Co. Ltd.
Halldórsson, Árni, et al.; "The sustainable agenda and energy efficiency: Logistics solutions and supply chains in times of climate change"; *International Journal of Physical Distribution & Logistics Management*; Bearing a date of 2010; pp. 5-13; vol. 40; No. ½; Emerald Group Publishing Ltd.
Halliday, B. S.; "An introduction to materials for use in vacuum"; *Vacuum*; Bearing a date of 1987; pp. 583-585; vol. 37; No. 8-9; Pergamon Journals Ltd.
Hirohata, Y.; "Hydrogen desorption behavior of aluminium materials used for extremely high vacuum chamber"; *Journal of Vacuum Science Technology*; Bearing a date of Sep./Oct. 1993; pp. 2637-2641; vol. 11; No. 5; American Vacuum Society.
Holtrop, K. L. et al.; "High temperature outgassing tests on materials used in the DIII-D tokamak"; Journal of Vacuum Science Technology; Bearing a date of Jul./Aug. 2006; pp. 1572- ; vol. 24; No. 4; American Vacuum Society.
Hong, S. et al.; "Investigation of gas species in a stainless steel ultrahigh vacuum chamber with hot cathode ionization gauges"; *Measurement Science and Technology*; Bearing a date of 2004; pp. 359-364; vol. 15; IOP Science.
Ishikawa, Y. et al.; "Reduction of outgassing from stainless surfaces by surface oxidation"; *Vacuum*; Bearing a date of 1990; pp. 1995-1997; vol. 4; No. 7-9; Pergamon Press PLC.
Ishikawa, Y.; "An overview of methods to suppress hydrogen outgassing rate from austenitic stainless steel with reference to UHV and EXV"; *Vacuum*; Bearing a date of 2003; pp. 501-512; vol. 69; No. 4; Elsevier Science Ltd.
Ishimaru, H. et al.; "All Aluminum Alloy Vacuum System for the Tristan e+ e-Storage"; *IEEE Transactions on Nuclear Science*; Bearing a date of Jun. 1981; pp. 3320-3322; vol. NS-28; No. 3.
Ishimaru, H. et al.; "Fast pump-down aluminum ultrahigh vacuum system"; *Journal of Vacuum Science Technology*; Bearing a date of May/Jun. 1992; pp. 547-552 ; vol. 10; No. 3; American Vacuum Society.
Ishimaru, H. et al.; "Turbomolecular pump with an ultimate pressure of $10^{-12}$ Torr"; *Journal of Vacuum Science Technology*; Bearing a date of Jul./Aug. 1994; pp. 1695-1698; vol. 12; No. 4; American Vacuum Society.
Ishimaru, H.; "All-aluminum-alloy ultrahigh vacuum system for a large-scale electron-positron collider"; *Journal of Vacuum Science Technology*; Bearing a date of Jun. 1984; pp. 1170-1175; vol. 2; No. 2; American Vacuum Society.
Ishimaru, H.; "Aluminium alloy-sapphire sealed window for ultrahigh vacuum"; *Vacuum*; Bearing a date of 1983; pp. 339-340.; vol. 33; No. 6; Pergamon Press Ltd.
Ishimaru, H.; "Bakeable aluminium vacuum chamber and bellows with an aluminium flange and metal seal for ultra-high vacuum"; *Journal of Vacuum Science Technology*; Bearing a date of Nov./Dec. 1978; pp. 1853-1854; vol. 15; No. 6; American Vacuum Society.
Ishimaru, H.; "Ultimate pressure of the order of $10^{-13}$ Torr in an aluminum alloy vacuum chamber"; *Journal of Vacuum Science and Technology*; Bearing a date of May/Jun. 1989; pp. 2439-2442; vol. 7; No. 3; American Vacuum Society.
Jacob, S. et al.; "Investigations into the thermal performance of multilayer insulation (300-77 K) Part 2: Thermal analysis"; *Cryogenics*; Bearing a date of 1992; pp. 1147-1153; vol. 32; No. 12; Butterworth-Heinemann Ltd.
Jacob, S. et al.; "Investigations into the thermal performance of multilayer insulation (300-77 K) Part 1: Calorimetric studies"; *Cryogenics*; Bearing a date of 1992; pp. 1137-1146; vol. 32; No. 12; Butterworth-Heinemann Ltd.
Jenkins, C. H. M.; "Gossamer spacecraft: membrane and inflatable structures technology for space applications"; AIAA; Bearing a date of 2000; pp. 503-527; vol. 191.
Jhung, K. H. C. et al.; "Achievement of extremely high vacuum using a cryopump and conflat aluminium"; *Vacuum*; Bearing a date of 1992; pp. 309-311; vol. 43; No. 4; Pergamon Press PLC.
Kato, S. et al.; "Achievement of extreme high vacuum in the order of $10^{-10}$ Pa without baking of test chamber"; Journal of Vacuum Science Technology; Bearing a date of May/Jun. 1990; pp. 2860-2864; vol. 8 ; No. 3; American Vacuum Society.
Keller, K. et al.; "Application of high temperature multilayer insulations"; *Acta Astronautica* ; Bearing a date of 1992; pp. 451-458; vol. 26; No. 6; Pergamon Press Ltd.
Koyatsu, Y. et al. "Measurements of outgassing rate from copper and copper alloy chambers"; *Vacuum*; Bearing a date of 1996; pp. 709-711; vol. 4; No. 6-8; Elsevier Science Ltd.
Kristensen, D. et al.; "Stabilization of vaccines: Lessons learned"; *Human Vaccines*; Bearing a date of Mar. 2010; pp. 227-231; vol. 6; No. 3; Landes Bioscience.
Kropschot, R. H.; "Multiple layer insulation for cryogenic applications"; *Cryogenics*; Bearing a date of Mar. 1961; pp. 135-135; vol. 1.
Li, Y.; "Design and pumping characteristics of a compact titanium—vanadium non-evaporable getter pump"; *Journal of Vacuum Science Technology*; Bearing a date of May/Jun. 1998; pp. 1139-1144; vol. 16; No. 3; American Vacuum Society.
Liu, Y. C. et al.; "Thermal outgassing study on aluminum surfaces"; *Vacuum*; Bearing a date of 1993; pp. 435-437; vol. 44; No. 5-7; Pergamon Press Ltd.
Londer, H. et al.; "New high capacity getter for vacuum insulated mobile $LH_2$ storage tank systems"; *Vacuum*; Bearing a date of 2008; pp. 431-434; vol. 82; No. 4; Elsevier Ltd.
Matsuda, A. et al.; "Simple structure insulating material properties for multilayer insulation"; *Cryogenics*; Bearing a date of Mar. 1980; pp. 135-138; vol. 20; IPC Business Press.
Mikhalchenko, R. S. et al.; "Study of heat transfer in multilayer insulations based on composite spacer materials."; *Cryogenics*; Bearing a date of Jun. 1983; pp. 309-311; vol. 23; Butterworth & Co. Ltd.
Mikhalchenko, R. S. et al.; "Theoretical and experimental investigation of radiative-conductive heat transfer in multilayer insulation"; *Cryogenics*; Bearing a date of May 1985; pp. 275-278; vol. 25; Butterworth & Co. Ltd.
Miki, M. et al.; "Characteristics of extremely fast pump-down process in an aluminum ultrahigh vacuum system"; Journal of Vacuum Science Technology; Bearing a date of Jul./Aug. 1994; pp. 1760-1766; vol. 12; No. 4; American Vacuum Society.
Mohri, M. et al.; "Surface study of Type 6063 aluminium alloys for vacuum chamber materials"; *Vacuum*; Bearing a date of 1984; pp. 643-647; vol. 34; No. 6; Pergamon Press Ltd.
Mukugi, K. et al.; "Characteristics of cold cathode gauges for outgassing measurements in uhv range"; *Vacuum*; Bearing a date of 1993; pp. 591-593; vol. 44; No. 5-7; Pergamon Press Ltd.
Nemanič, V. et al.; "Anomalies in kinetics of hydrogen evolution from austenitic stainless steel from 300 to 1000°C"; *Journal of Vacuum Science Technology*; Bearing a date of Jan./Feb. 2001; pp. 215-222; vol. 19; No. 1; American Vacuum Society.
Nemanič, V. et al.; "Outgassing in thin wall stainless steel cells"; *Journal of Vacuum Science Technology*; Bearing a date of May/Jun. 1999; pp. 1040-1046; vol. 17; No. 3; American Vacuum Society.

(56) References Cited

OTHER PUBLICATIONS

Nemanič, V.; "Outgassing of thin wall stainless steel chamber"; *Vacuum*; Bearing a date of 1998; pp. 431-437; vol. 50; No. 3-4; Elsevier Science Ltd.

Nemanič, V.; "Vacuum insulating panel"; *Vacuum*; bearing a date of 1995; pp. 839-842; vol. 46; No. 8-10; Elsevier Science Ltd.

Odaka, K. et al.;"Effect of baking temperature and air exposure on the outgassing rate of type 316L stainless steel"; *Journal of Vacuum Science Technology*; Bearing a date of Sep./Oct. 1987; pp. 2902-2906; vol. 5; No. 5; American Vacuum Society.

Odaka, K.; "Dependence of outgassing rate on surface oxide layer thickness in type 304 stainless steel before and after surface oxidation in air"; *Vacuum*; Bearing a date of 1996; pp. 689-692; vol. 47; No. 6-8; Elsevier Science Ltd.

Okamura, S. et al.; "Outgassing measurement of finely polished stainless steel"; *Journal of Vacuum Science Technology*; Bearing a date of Jul./Aug. 1991; pp. 2405-2407; vol. 9; No. 4; American Vacuum Society.

Patrick, T. J.; "Outgassing and the choice of materials for space instrumentation"; *Vacuum*; Bearing a date of 1973; pp. 411-413; vol. 23; No. 11; Pergamon Press Ltd.

Patrick, T. J.; "Space environment and vacuum properties of spacecraft materials"; *Vacuum*; Bearing a date of 1981; pp. 351-357; vol. 31; No. 8-9; Pergamon Press Ltd.

Poole, K. F. et al.; "Hialvac and Teflon outgassing under ultra-high vacuum conditions"; *Vacuum*; Bearing a date of Jun. 30, 1980; pp. 415-417; vol. 30; No. 10; Pergamon Press Ltd.

Redhead, P. A.; "Recommended practices for measuring and reporting outgassing data"; *Journal of Vacuum Science Technology*; Bearing a date of Sep./Oct. 2002; pp. 1667-1675; vol. 20; No. 5; American Vacuum Society.

Rutherford, S; "The Benefits of Viton Outgassing"; Bearing a date of 1997; pp. 1-5; Duniway Stockroom Corp.

Saito, K. et al.; "Measurement system for low outgassing materials by switching between two pumping paths"; *Vacuum*; Bearing a date of 1996; pp. 749-752; vol. 47; No. 6-8; Elsevier Science Ltd.

Saitoh, M. et al.; "Influence of vacuum gauges on outgassing rate measurements" ; *Journal of Vacuum Science Technology*; Bearing a date of Sep./Oct. 1993; pp. 2816-2821; vol. 11; No. 5; American Vacuum Society.

Santhanam, S. M. T. J. et al. ;"Outgassing rate of reinforced epoxy and its control by different pretreatment methods"; *Vacuum*; Bearing a date of 1978; pp. 365-366; vol. 28; No. 8-9; Pergamon Press Ltd.

Sasaki, Y. T.; "Reducing SS 304/316 hydrogen outgassing to $2 \times 10^{-15}$ torr $l/cm^2 s$"; *Journal of Vacuum Science Technology*; Bearing a date of Jul./Aug. 2007; pp. 1309-1311; vol. 25; No. 4; American Vacuum Society.

Scurlock, R. G. et al.; "Development of multilayer insulations with thermal conductivities below 0.1 µW $cm^{-1}K^{-1}$"; *Cryogenics*; Bearing a date of May 1976; pp. 303-311; vol. 16.

Setia, S. et al.; "Frequency and causes of vaccine wastage"; *Vaccine*; Bearing a date of 2002; pp. 1148-1156; vol. 20; Elsevier Science Ltd.

Shu, Q. S. et al.; "Heat flux from 277 to 77 K through a few layers of multilayer insulation"; *Cryogenics*; Bearing a date of Dec. 1986; pp. 671-677; vol. 26; Butterworth & Co. Ltd.

Shu, Q. S. et al.; "Systematic study to reduce the effects of cracks in multilayer insulation Part 1: Theoretical model"; *Cryogenics*; Bearing a date of May 1987; pp. 249-256; vol. 27; Butterworth & Co. Ltd.

Shu, Q. S. et al.; "Systematic study to reduce the effects of cracks in multilayer insulation Part 2: experimental results"; *Cryogenics*; Bearing a date of Jun. 1987; pp. 298-311; vol. 27; No. 6; Butterworth & Co. Ltd.

Suemitsu, M. et al.; "Development of extremely high vacuums with mirror-polished Al-alloy chambers"; *Vacuum*; Bearing a date of 1993; pp. 425-428; vol. 44; No. 5-7; Pergamon Press Ltd.

Suemitsu, M. et al.; "Ultrahigh-vacuum compatible mirror-polished aluminum-alloy surface: Observation of surface-roughness-correlated outgassing rates"; *Journal of Vacuum Science Technology*; Bearing a date of May/Jun. 1992; pp. 570-572; vol. 10; No. 3; American Vacuum Society.

Tatenuma, K. et al.; "Acquisition of clean ultrahigh vacuum using chemical treatment"; Journal of Vacuum Science Technology; Bearing a date of Jul./Aug. 1998; pp. 2693-2697; vol. 16; No. 4; American Vacuum Society.

Tatenuma, K.; "Quick acquisition of clean ultrahigh vacuum by chemical process technology"; *Journal of Vacuum Science Technology*; Bearing a date of Jul./Aug. 1993; pp. 2693-2697; vol. 11; No. 4; American Vacuum Society.

Tripathi, A. et al.; "Hydrogen intake capacity of ZrVFe alloy bulk getters"; *Vacuum*; Bearing a date of Aug. 6, 1997; pp. 1023-1025; vol. 48; No. 12; Elsevier Science Ltd.

Watanabe, S. et al.; "Reduction of outgassing rate from residual gas analyzers for extreme high vacuum measurements"; *Journal of Vacuum Science Technology*; Bearing a date of Nov./Dec. 1996; pp. 3261-3266; vol. 14; No. 6; American Vacuum Society.

Wiedemann, C. et al.; "Multi-layer Insulation Literatures Review"; *Advances*; Printed on May 2, 2011; pp. 1-10; German Aerospace Center.

Yamazaki, K. et al.; "High-speed pumping to UHV"; *Vacuum*; Bearing a date of 2010; pp. 756-759; vol. 84; Elsevier Science Ltd.

Zalba, B. et al.; "Review on thermal energy storage with phase change: materials, heat transfer analysis and applications"; *Applied Thermal Engineering*; Bearing a date of 2003; pp. 251-283; vol. 23; Elsevier Science Ltd.

Zhitomirskij, I.S. et al.; "A theoretical model of the heat transfer processes in multilayer insulation"; *Cryogenics*; Bearing a date of May 1979; pp. 265-268; IPC Business Press.

PCT International Search Report; International App. No. PCT/US08/13646; Apr. 9, 2009; pp. 1-2.

PCT International Search Report; International App. No. PCT/US08/13648; Mar. 13, 2009; pp. 1-2.

PCT International Search Report; International App. No. PCT/US08/13642; Feb. 26, 2009; pp. 1-2.

"Silicon Carbide—Band Structure and Carrier Concentration"; NSM Archive; bearing a date of Jan. 22, 2004 and printed on Feb. 16, 2013; pp. 1-11; located at http://www.ioffe.rssi.ru/SVA/NSM/Semicond/SiC/bandstr.html.

Bine Informationsdienst; "Zeolite/water refrigerators, Projektinfo 16/10"; BINE Information Service; printed on Feb. 12, 2013; pp. 1-4; FIZ Karlsruhe, Germany; located at: http://www.bine.info/fileadmin/content/Publikationen/Englische_Infos/projekt_1610_engl_internetx.pdf.

Conde-Petit, Manuel R.; "Aqueous solutions of lithium and calcium chlorides:—Property formulations for use in air conditioning equipment design"; 2009; pp. 1-27 plus two cover pages; M. Conde Engineering, Zurich, Switzerland.

Cool-System KEG GmbH; "Cool-System presents: CoolKeg® The world's first self-chilling Keg!"; printed on Feb. 6, 2013; pp. 1-5; located at: http://www.coolsystem.de/.

Dawoud, et al.; "Experimental study on the kinetics of water vapor sorption on selective water sorbents, silica gel and alumina under typical operating conditions of sorption heat pumps"; International Journal of Heat and Mass Transfer; 2003; pp. 273-281; vol. 46; Elsevier Science Ltd.

Dometic S.A.R.L.; "Introduction of Zeolite Technology into refrigeration systems, LIFE04 ENV/LU/000829, Layman's Report"; printed on Feb. 6, 2013; pp. 1-10; located at: http://ec.europa.eu/environment/life/project/Projects/index.cfm?fuseaction=home.showFile&rep=file&fil=LIFE042_ENV_LU_000829_LAYMAN.pdf.

Dow Chemical Company; "Calcium Chloride Handbook: A Guide to Properties, Forms, Storage and Handling"; Aug. 2003; pp. 1-28.

Gast Manufacturing, Inc.; "Vacuum and Pressure Systems Handbook"; printed on Jan. 3, 2013; pp. 1-20; located at: http://www.gastmfg.com/vphb/vphb_s1.pdf.

Gea Wiegand; "Pressure loss in vacuum lines with water vapour"; printed on Mar. 13, 2013; pp. 1-2; located at: http://produkte.gea-wiegand.de/GEA/GEACategory/139/index_en.html.

(56) References Cited

OTHER PUBLICATIONS

Hall, Larry D.; "Building Your Own Larry Hall Icyball"; printed on Mar. 27, 2013; pp. 1-4; located at: http://crosleyautoclub.com/IcyBall/HomeBuilt/HallPlans/IB_Directions.html.
Kozubal, et al.; "Desiccant Enhanced Evaporative Air-Conditioning (DEVap): Evaluation of a New Concept in Ultra Efficient Air Conditioning, Technical Report NREL/TP-5500-49722"; National Renewable Energy Laboratory; Jan. 2011; pp. i-vii, 1-60, plus three cover pages and Report Documentation Page.
Machine-history.com; "Refrigeration Machines"; printed on Mar. 27, 2013; pp. 1-10; located at: http://www.machine-history.com/Refrigeration%20Machines.
Marquardt, Niels; "Introduction to the Principles of Vacuum Physics"; 1999; pp. 1-24; located at: http://www.cientificosaficionados.com/libros/CERN/vacio-1-CERN.pdf.
Modern Mechanix; "Icyball Is Practical Refrigerator for Farm or Camp Use (Aug. 1930)"; bearing a date of Aug. 1930; printed on Mar. 27, 2013; pp. 1-3; located at: http://blog.modernmechanix.com/icyball-is-practical-refridgerator-for-farm-or-camp-use/.
Oxychem; "Calcium Chloride, A Guide to Physical Properties"; printed on Jan. 3, 2013; pp. 1-9, plus two cover pages and back page; Occidental Chemical Corporation; located at: http://www.cal-chlor.com/PDF/GUIDE-physical-properties.pdf.
Restuccia, et al.; "Selective water sorbent for solid sorption chiller: experimental results and modeling"; International Journal of Refrigeration; 2004; pp. 284-293; vol. 27; Elsevier Ltd and IIR.
Rezk, et al.; "Physical and operating conditions effects on silica gel/water adsorption chiller performance"; Applied Energy; 2012; pp. 142-149; vol. 89; Elsevier Ltd.
Rietschle Thomas; "Calculating Pipe Size & Pressure Drops in Vacuum Systems, Section 9—Technical Reference"; printed on Jan. 3, 2013; pp. 9-5 through 9-7; located at: http://www.ejglobalinc.com/Tech.htm.
Saha, et al.; "A new generation of cooling device employing CaCl2-in-silica gel-water system"; International Journal of Heat and Mass Transfer; 2009; pp. 516-524; vol. 52; Elsevier Ltd.
UOP; "An Introduction to Zeolite Molecular Sieves"; printed on Jan. 10, 2013; pp. 1-20; located at: http://www.eltrex.pl/pdf/karty/adsorbenty/ENG-Introduction%20to%20Zeolite%20Molecular%20Sieves.pdf.
Wang, et al.; "Study of a novel silica gel-water adsorption chiller. Part I. Design and performance prediction"; International Journal of Refrigeration; 2005; pp. 1073-1083; vol. 28; Elsevier Ltd and IIR.
Wikipedia; "Icyball"; Mar. 14, 2013; printed on Mar. 27, 2013; pp. 1-4; located at: http://en.wikipedia.org/wiki/Icyball.
PCT International Search Report; International App. No. PCT/US 11/00234; Jun. 9, 2011; pp. 1-4.
Winn, Joshua N. et al.; "Omnidirectional reflection from a one-dimensional photonic crystal"; Optics Letters; Oct. 15, 1998; pp. 1573-1575; vol. 23, No. 20; Optical Society of America.
Cabeza, L. F. et al.; "Heat transfer enhancement in water when used as PCM in thermal energy storage"; Applied Thermal Engineering; 2002; pp. 1141-1151; vol. 22; Elsevier Science Ltd.
Chen, Dexiang et al.; "Characterization of the freeze sensitivity of a hepatitis B vaccine"; Human Vaccines; Jan. 2009; pp. 26-32; vol. 5, Issue 1; Landes Bioscience.
Edstam, James S. et al.; "Exposure of hepatitis B vaccine to freezing temperatures during transport to rural health centers in Mongolia"; Preventive Medicine; 2004; pp. 384-388; vol. 39; The Institute for Cancer Prevention and Elsevier Inc.
Efe, Emine et al.; "What do midwives in one region in Turkey know about cold chain?"; Midwifery; 2008; pp. 328-334; vol. 24; Elsevier Ltd.
Günter, M. M. et al.; "Microstructure and bulk reactivity of the nonevaporable getter $Zr_{57}V_{36}Fe_7$"; J. Vac. Sci. Technol. A; Nov./Dec. 1998; pp. 3526-3535; vol. 16, No. 6; American Vacuum Society.
Hipgrave, David B. et al.; "Immunogenicity of a Locally Produced Hepatitis B Vaccine With The Birth Dose Stored Outside The Cold Chain in Rural Vietnam"; Am. J. Trop. Med. Hyg.; 2006; pp. 255-260; vol. 74, No. 2; The American Society of Tropical Medicine and Hygiene.
Hipgrave, David B. et al.; "Improving birth dose coverage of hepatitis B vaccine"; Bulletin of the World Health Organization; Jan. 2006; pp. 65-71; vol. 84, No. 1; World Health Organization.
Hobson, J. P. et al.; "Pumping of methane by St707 at low temperatures"; J. Vac. Sci. Technol. A; May/Jun. 1986; pp. 300-302; vol. 4, No. 3; American Vacuum Society.
Kendal, Alan P. et al.; "Validation of cold chain procedures suitable for distribution of vaccines by public health programs in the USA"; Vaccine; 1997; pp. 1459-1465; vol. 15, No. 12/13; Elsevier Science Ltd.
Khemis, O. et al.; "Experimental analysis of heat transfers in a cryogenic tank without lateral insulation"; Applied Thermal Engineering; 2003; pp. 2107-2117; vol. 23; Elsevier Ltd.
Li, Yang et al.; "Study on effect of liquid level on the heat leak into vertical cryogenic vessels"; Cryogenics; 2010; pp. 367-372; vol. 50; Elsevier Ltd.
Magennis, Teri et al. "Pharmaceutical Cold Chain: A Gap in the Last Mile—Part 1. Wholesaler/Distributer: Missing Audit Assurance"; Pharmaceutical & Medical Packaging News; Sep. 2010; pp. 44, 46-48, and 50; pmpnews.com.
Matolin, V. et al.; "Static SIMS study of TiZrV NEG activation"; Vacuum; 2002; pp. 177-184; vol. 67; Elsevier Science Ltd.
Nelson, Carib M. et al.; "Hepatitis B vaccine freezing in the Indonesian cold chain: evidence and solutions"; Bulletin of the World Health Organization; Feb. 2004; pp. 99-105 (plus copyright page); vol. 82, No. 2; World Health Organization.
Ren, Qian et al.; "Evaluation of an Outside-The-Cold-Chain Vaccine Delivery Strategy in Remote Regions of Western China"; Public Health Reports; Sep.-Oct. 2009; pp. 745-750; vol. 124.
Rogers, Bonnie et al.; "Vaccine Cold Chain—Part 1. Proper Handling and Storage of Vaccine"; AAOHN Journal; 2010; pp. 337-344 (plus copyright page); vol. 58, No. 8; American Association of Occupational Health Nurses, Inc.
Rogers, Bonnie et al.; Vaccine Cold Chain—Part 2. Training Personnel and Program Management; AAOHN Journal; 2010; pp. 391-402 (plus copyright page); vol. 58, No. 9; American Association of Occupational Health Nurses, Inc.
Techathawat, Sirirat et al.; "Exposure to heat and freezing in the vaccine cold chain in Thailand"; Vaccine; 2007; p. 1328-1333; vol. 25; Elsevier Ltd.
Thakker, Yogini et al.; "Storage of Vaccines in the Community: Weak Link in the Cold Chain?"; British Medical Journal; Mar. 21, 1992; pp. 756-758; vol. 304, No. 6829; BMJ Publishing Group.
Wang, Lixia et al.; "Hepatitis B vaccination of newborn infants in rural China: evaluation of a village-based, out-of-cold-chain delivery strategy"; Bulletin of the World Health Organization; Sep. 2007; pp. 688-694; vol. 85, No. 9; World Health Organization.
World Health Organization; "Guidelines on the international packaging and shipping of vaccines"; Department of Immunization, Vaccines and Biologicals; Dec. 2005; 40 pages; WHO/IVB/05.23.
Chinese State Intellectual Property Office; First Office Action; App No. 200880119918.0; Jul. 13, 2011.
Chinese State Intellectual Property Office; Office Action; Chinese Application No. 200980109399.4; dated Aug. 29, 2012; pp. 1-12 (No translation provided).
Chinese Office Action; Application No. 200880120367.X; Oct. 25, 2012 (received by our agent on Oct. 29, 2012); pp. 1-5; No English Translation Provided.
Saes Getters; "St707 Getter Alloy for Vacuum Systems"; printed on Sep. 22, 2011; pp. 1-2; located at http://www.saegetters.com/default.aspx?idPage=212.
Chinese State Intellectual Property Office, Office Action; App. No. 201180016103.1 (based on PCT Patent Application No. PCT/US2011/000234); Jun. 23, 2014 (received by our Agent on Jun. 25, 2014); pp. 1-23.
U.S. Appl. No. 13/906,909, Bloedow et al.
Abdul-Wahab et al.; "Design and experimental investigation of portable solar thermoelectric refrigerator"; Renewable Energy; 2009; pp. 30-34; vol. 34; Elsevier Ltd.

(56) References Cited

OTHER PUBLICATIONS

Astrain et al.; "Computational model for refrigerators based on Peltier effect application"; Applied Thermal Engineering; 2005; pp. 3149-3162; vol. 25; Elsevier Ltd.

Azzouz et al.; "Improving the energy efficiency of a vapor compression system using a phase change material"; Second Conference on Phase Change Material & Slurry: Scientific Conference & Business Forum; Jun. 15-17, 2005; pp. 1-11; Yverdon-les-Bains, Switzerland.

Chatterjee et al.; "Thermoelectric cold-chain chests for storing/transporting vaccines in remote regions"; Applied Energy; 2003; pp. 415-433; vol. 76; Elsevier Ltd.

Chiu et al.; "Submerged finned heat exchanger latent heat storage design and its experimental verification"; Applied Energy; 2012; pp. 507-516; vol. 93; Elsevier Ltd.

Conway et al.; "Improving Cold Chain Technologies through the Use of Phase Change Material"; Thesis, University of Maryland; 2012; pp. ii-xv and 16-228.

Dai et al.; "Experimental investigation and analysis on a thermoelectric refrigerator driven by solar cells"; Solar Energy Materials & Solar Cells; 2003; pp. 377-391; vol. 77; Elsevier Science B.V.

Ghoshal et al.; "Efficient Switched Thermoelectric Refrigerators for Cold Storage Applications"; Journal of Electronic Materials; 2009; pp. 1-6; doi: 10.1007/s11664-009-0725-3.

Groulx et al.; "Solid-Liquid Phase Change Simulation Applied to a Cylindrical Latent Heat Energy Storage System"; Excerpt from the Proceedings of the COMSOL Conference, Boston; 2009; pp. 1-7.

Jiajitsawat, Somchai; "A Portable Direct-PV Thermoelectric Vaccine Refrigerator with Ice Storage Through Heat Pipes"; Dissertation, University of Massachusetts, Lowell; 2008; three cover pages, pp. ii-x, 1-137.

Kempers et al.; "Characterization of evaporator and condenser thermal resistances of a screen mesh wicked heat pipe"; International Journal of Heat and Mass Transfer; 2008; pp. 6039-6046; vol. 51; Elsevier Ltd.

Mohamad et al.; "An Analysis of Sensitivity Distribution Using Two Differential Excitation Potentials in ECT"; IEEE Fifth International Conference on Sensing Technology; 2011; pp. 575-580; IEEE.

Mohamad et al.; "A introduction of two differential excitation potentials technique in electrical capacitance tomography"; Sensors and Actuators A; 2012; pp. 1-10; vol. 180; Elsevier B.V.

Mughal et al.; "Review of Capacitive Atmospheric Icing Sensors"; The Sixth International Conference on Sensor Technologies and Applications (SENSORCOMM); 2012; pp. 42-47; IARIA.

Omer et al.; "Design optimization of thermoelectric devices for solar power generation"; Solar Energy Materials and Solar Cells; 1998; pp. 67-82; vol. 53; Elsevier Science B.V.

Omer et al.; "Experimental investigation of a thermoelectric refrigeration system employing a phase change material integrated with thermal diode (thermosyphons)"; Applied Thermal Engineering; 2001; pp. 1265-1271; vol. 21; Elsevier Science Ltd.

Oró et al.; "Review on phase change materials (PCMs) for cold thermal energy storage applications"; Applied Energy; 2012; pp. 1-21; doi: 10.1016/j.apenergy.2012.03.058; Elsevier Ltd.

Owusu, Kwadwo Poku; "Capacitive Probe for Ice Detection and Accretion Rate Measurement: Proof of Concept"; Master of Science Thesis, Department of Mechanical Engineering, University of Manitoba; 2010; pp. i-xi, 1-95.

Peng et al.; "Determination of the optimal axial length of the electrode in an electrical capacitance tomography sensor"; Flow Measurement and Instrumentation; 2005; pp. 169-175; vol. 16; Elsevier Ltd.

Peng et al.; "Evaluation of Effect of Number of Electrodes in ECT Sensors on Image Quality"; IEEE Sensors Journal; May 2012; pp. 1554-1565; vol. 12, No. 5; IEEE.

Riffat et al.; "A novel thermoelectric refrigeration system employing heat pipes and a phase change material: an experimental investigation"; Renewable Energy; 2001; pp. 313-323; vol. 23; Elsevier Science Ltd.

Robak et al.; "Enhancement of latent heat energy storage using embedded heat pipes"; International Journal of Heat and Mass Transfer; 2011; pp. 3476-3483; vol. 54; Elsevier Ltd.

Rodríguez et al.; "Development and experimental validation of a computational model in order to simulate ice cube production in a thermoelectric ice maker"; Applied Thermal Engineering; 2009; one cover page and pp. 1-28; doi: 10.1016/j.applthermaleng.2009.03.005.

Russel et al.; "Characterization of a thermoelectric cooler based thermal management system under different operating conditions"; Applied Thermal Engineering; 2012; two cover pages and pp. 1-29; doi: 10.1016/j.applthermaleng.2012.05.002.

Sharifi et al.; "Heat pipe-assisted melting of a phase change material"; International Journal of Heat and Mass Transfer; 2012; pp. 3458-3469; vol. 55; Elsevier Ltd.

Stampa et al.; "Numerical Study of Ice Layer Growth Around a Vertical Tube"; Engenharia Térmica (Thermal Engineering); Oct. 2005; pp. 138-144; vol. 4, No. 2.

Vián et al.; "Development of a thermoelectric refrigerator with two-phase thermosyphons and capillary lift"; Applied Thermal Engineering; 2008; one cover page and pp. 1-16 doi: 10.1016/j.applthermaleng.2008.09.018.

Ye et al.; "Evaluation of Electrical Capacitance Tomography Sensors for Concentric Annulus"; IEEE Sensors Journal; Feb. 2013; pp. 446-456; vol. 13, No. 2; IEEE.

Yu et al.; "Comparison Study of Three Common Technologies for Freezing-Thawing Measurement"; Advances in Civil Engineering; 2010; pp. 1-10; doi: 10.1155/2010/239651.

"About Heat Leak—Comparison"; Technifab Products, Inc.; printed on Jun. 25, 2014; 2 pages; located at www.technifab.com/cryogenic-resource-library/about-heat-leak.html.

PCT International Search Report; International App. No. PCT/US2014/067863; Mar. 27, 2015; pp. 1-3.

* cited by examiner

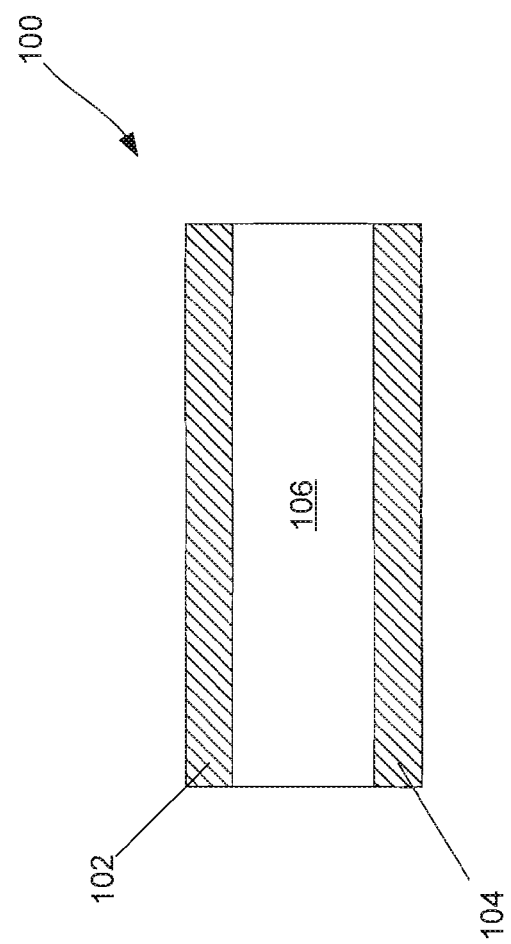

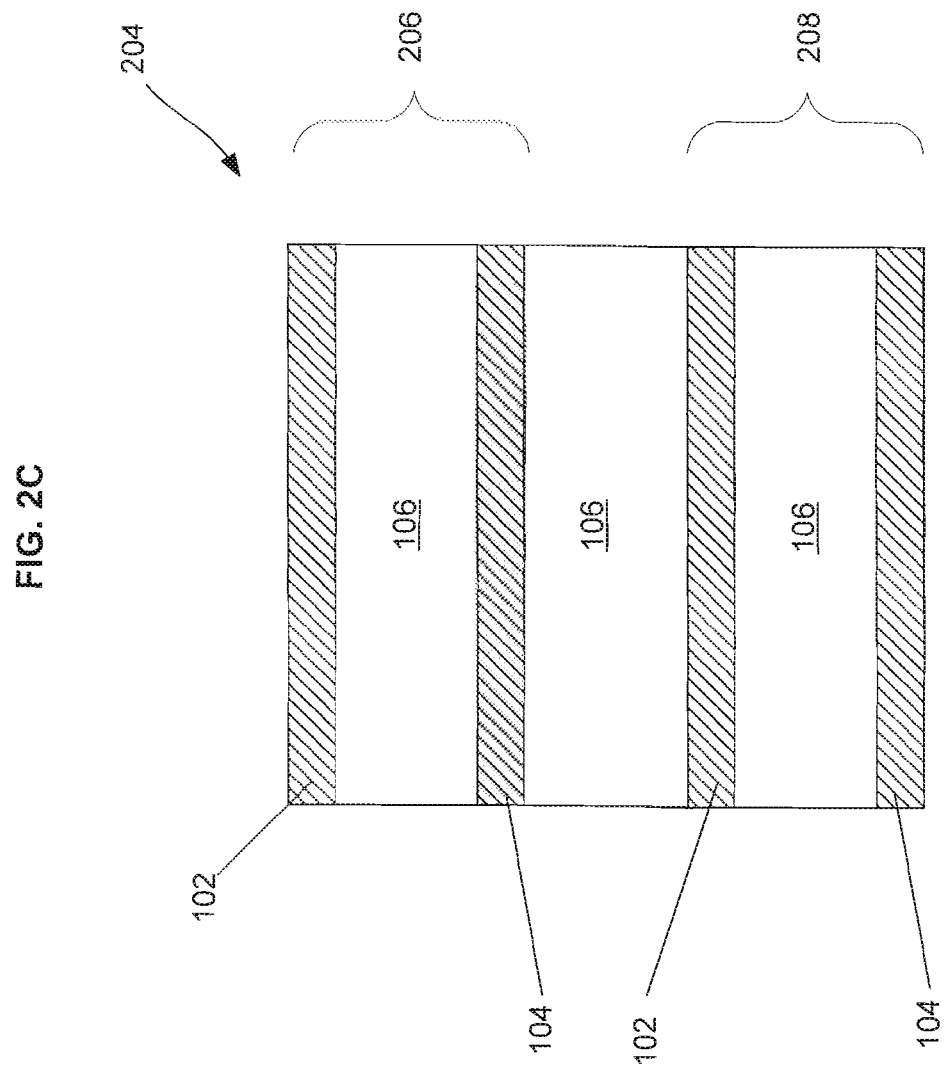

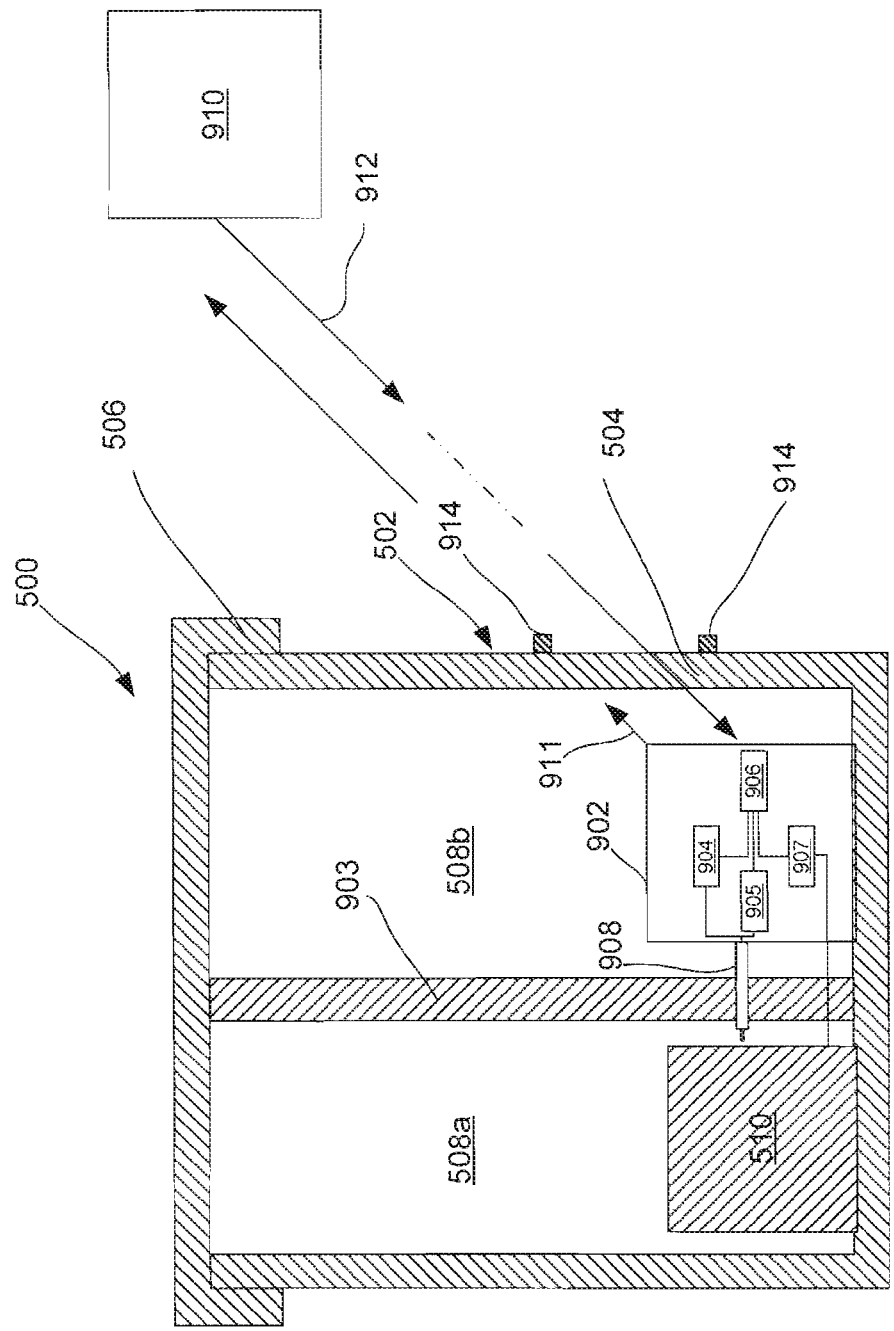

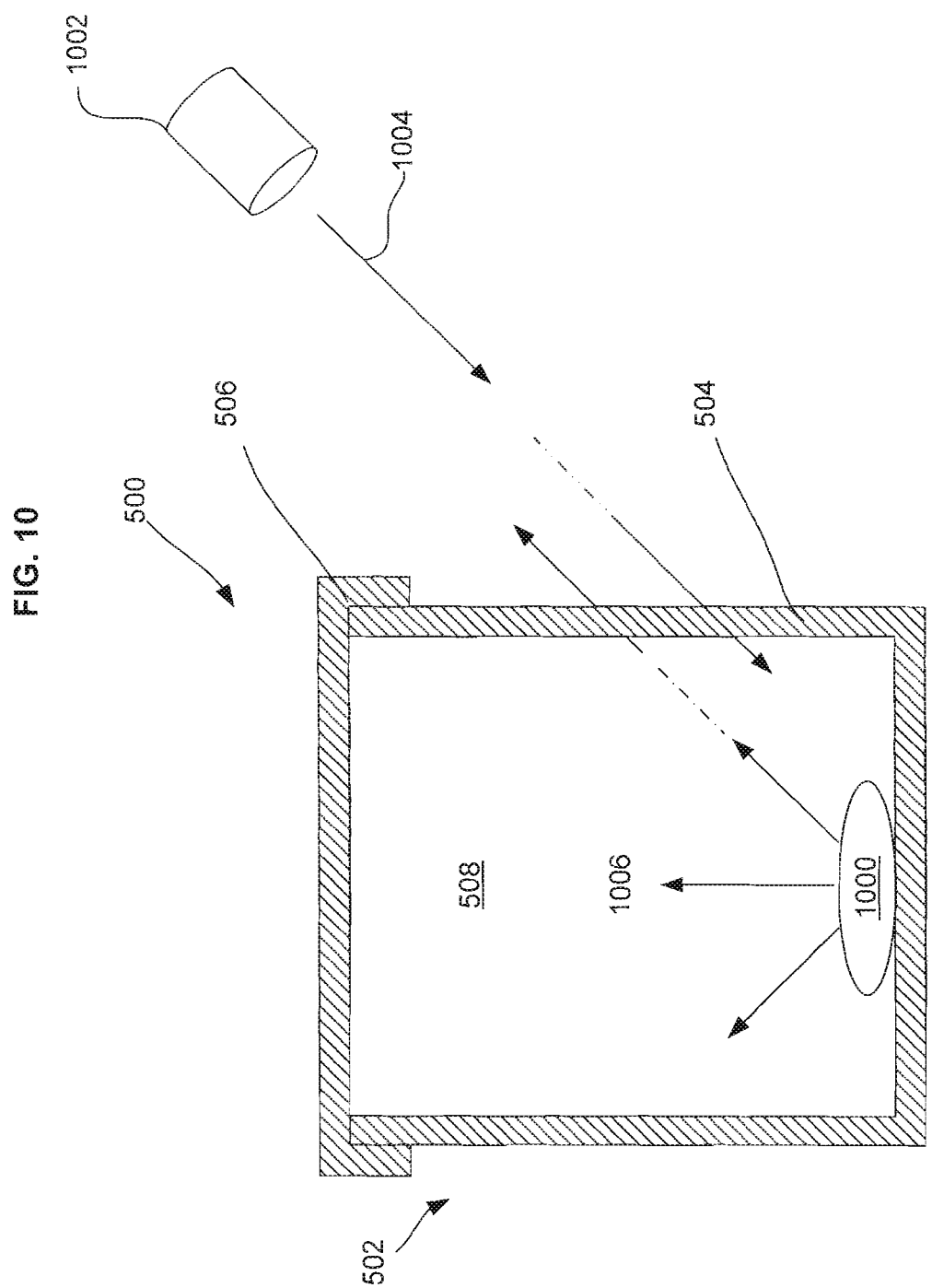

STORAGE CONTAINER INCLUDING MULTI-LAYER INSULATION COMPOSITE MATERIAL HAVING BANDGAP MATERIAL

CROSS-REFERENCE TO RELATED APPLICATIONS

For purposes of the USPTO extra-statutory requirements, the present application constitutes a divisional of U.S. patent application Ser. No. 12/152,465, entitled STORAGE CONTAINER INCLUDING MULTI-LAYER INSULATION COMPOSITE MATERIAL HAVING BANDGAP MATERIAL, naming Jeffrey A. Bowers, Roderick A. Hyde, Muriel Y. Ishikawa, Edward K. Y. Jung, Jordin T. Kare, Eric C. Leuthardt, Nathan P. Myhrvold, Thomas J. Nugent Jr., Clarence T. Tegreene, Charles Whitmer, and Lowell L. Wood Jr. as inventors, filed 13 May 2008, which is currently co-pending or is an application of which a currently co-pending application is entitled to the benefit of the filing date.

The present application is related to U.S. Patent Application entitled MULTI-LAYER INSULATION COMPOSITE MATERIAL INCLUDING BANDGAP MATERIAL, STORAGE CONTAINER USING SAME, AND RELATED METHODS, naming Jeffrey A. Bowers, Roderick A. Hyde, Muriel Y. Ishikawa, Edward K. Y. Jung, Jordin T. Kare, Eric C. Leuthardt, Nathan P. Myhrvold, Thomas J. Nugent Jr., Clarence T. Tegreene, Charles Whitmer, and Lowell L. Wood Jr. as inventors, filed currently herewith, and incorporated herein by this reference in its entirety.

The present application is related to U.S. patent application Ser. No. 12/001,757 entitled TEMPERATURE-STABILIZED STORAGE CONTAINERS, naming Roderick A. Hyde, Edward K. Y. Jung, Nathan P. Myhrvold, Clarence T. Tegreene, William H. Gates, III, Charles Whitmer, and Lowell L. Wood, Jr. as inventors, filed on Dec. 11, 2007, and incorporated herein by this reference in its entirety.

The present application is related to U.S. patent application Ser. No. 12/008,695 entitled TEMPERATURE-STABILIZED STORAGE CONTAINERS FOR MEDICINALS, naming Roderick A. Hyde, Edward K. Y. Jung, Nathan P. Myhrvold, Clarence T. Tegreene, William H. Gates, III, Charles Whitmer, and Lowell L. Wood, Jr. as inventors, filed on Jan. 10, 2008, and incorporated herein by this reference in its entirety.

The present application is related to U.S. patent application Ser. No. 12/006,089 entitled TEMPERATURE-STABILIZED STORAGE SYSTEMS, naming Roderick A. Hyde, Edward K. Y. Jung, Nathan P. Myhrvold, Clarence T. Tegreene, William H. Gates, III, Charles Whitmer, and Lowell L. Wood, Jr. as inventors, filed on Dec. 27, 2007, and incorporated herein by this reference in its entirety.

The present application is related to U.S. patent application Ser. No. 12/006,088 entitled TEMPERATURE-STABILIZED STORAGE CONTAINERS WITH DIRECTED ACCESS, naming Roderick A. Hyde, Edward K. Y. Jung, Nathan P. Myhrvold, Clarence T. Tegreene, William H. Gates, III, Charles Whitmer, and Lowell L. Wood, Jr. as inventors, filed on Dec. 27, 2007, and incorporated herein by this reference in its entirety.

The present application is related to U.S. patent application Ser. No. 12/012,490 entitled METHODS OF MANUFACTURING TEMPERATURE-STABILIZED STORAGE CONTAINERS, naming Roderick A. Hyde, Edward K. Y. Jung, Nathan P. Myhrvold, Clarence T. Tegreene, William H. Gates, III, Charles Whitmer, and Lowell L. Wood, Jr. as inventors, filed on Jan. 31, 2008, and incorporated herein by this reference in its entirety.

The present application is related to U.S. patent application Ser. No. 12/077,322 entitled TEMPERATURE-STABILIZED MEDICINAL STORAGE SYSTEMS, naming Roderick A. Hyde, Edward K. Y. Jung, Nathan P. Myhrvold, Clarence T. Tegreene, William Gates, Charles Whitmer, and Lowell L. Wood, Jr. as inventors, filed on Mar. 17, 2008, and incorporated herein by this reference in its entirety.

SUMMARY

In an embodiment, a storage container includes a container structure defining at least one storage chamber. The container structure includes multi-layer insulation (MLI) composite material having at least one thermally-reflective layer. The at least one thermally-reflective layer includes bandgap material that is transmissive to radio-frequency electromagnetic radiation.

In an embodiment, a method includes transmitting one or more radio-frequency signals from at least one first device associated with at least one storage chamber defined by a container structure and through the container structure. The container structure includes MLI composite material having bandgap material that is transmissive to the one or more radio-frequency signals.

In an embodiment, a method includes transmitting one or more radio-frequency signals through a container structure defining at least one storage chamber from at least one first device positioned external to the container structure. The container structure includes MLI composite material having bandgap material that is transmissive to the one or more radio-frequency signals.

In an embodiment, a method includes receiving one or more radio-frequency signals transmitted through a container structure defining at least one storage chamber and from at least one first device positioned external to the container structure. The container structure includes MLI composite material having bandgap material that is transmissive to the one or more radio-frequency signals.

In an embodiment, a method receiving one or more radio-frequency signals transmitted through a container structure defining at least one storage chamber and from at least one first device associated with the at least one storage chamber. The container structure includes MLI composite material having bandgap material that is transmissive to the one or more radio-frequency signals.

In an embodiment, a method includes transmitting excitation electromagnetic radiation through a container structure to excite one or more molecules located in a storage chamber therein. The container structure includes MLI composite material having bandgap material that is transmissive to the excitation electromagnetic radiation. The method further includes, responsive to the transmitting excitation electromagnetic radiation, receiving electromagnetic radiation emitted from the one or more molecules and through the MLI composite material.

The foregoing is a summary and thus may contain simplifications, generalizations, inclusions, and/or omissions of detail; consequently, those skilled in the art will appreciate that the summary is illustrative only and is NOT intended to be in any way limiting. Other aspects, features, and advantages of the devices and/or processes and/or other subject matter described herein will become apparent in the teachings set forth herein.

BRIEF DESCRIPTION OF THE FIGURES

FIG. 1 is a partial cross-sectional view of a MLI composite material, according to an embodiment, which is configured to reflect infrared EMR.

FIG. 2C is a partial cross-sectional view of a MLI composite material including two or more of the MLI composite materials shown in FIG. 1 stacked together according to an embodiment.

FIG. 9 is a schematic cross-sectional view of a storage container including a temperature-control device according to an embodiment.

FIG. 10 is a cross-sectional view of a storage container including a container structure having molecules stored therein that may emit EMR through the container structure responsive to excitation EMR according to an embodiment.

DETAILED DESCRIPTION

Figure 2A:
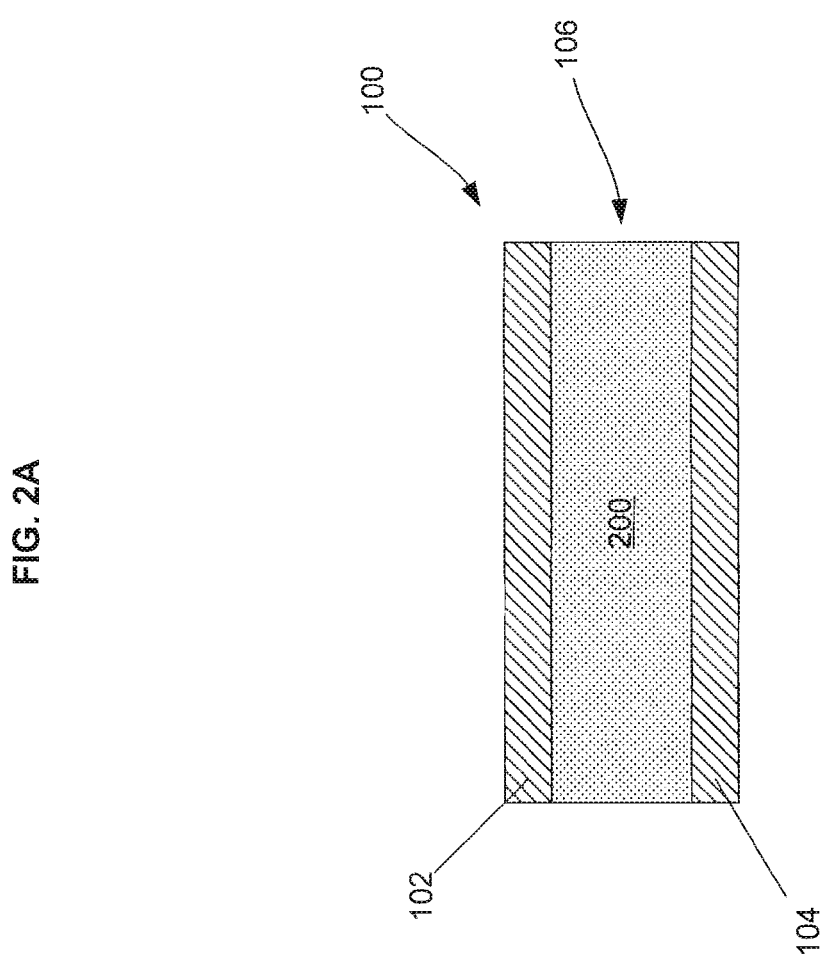
FIG. 2A is a partial cross-sectional view of the MLI composite material shown in FIG. 1, with a region between the first and second thermally-reflective layers including aerogel particles, according to an embodiment.

In the following detailed description, reference is made to the accompanying drawings, which form a part hereof. In the drawings, similar symbols typically identify similar components, unless context dictates otherwise. The illustrative embodiments described in the detailed description, drawings, and claims are not meant to be limiting. Other embodiments may be utilized, and other changes may be made, without departing from the spirit or scope of the subject matter presented herein.

FIG. 1 is a partial cross-sectional view of a MLI composite material 100, according to an embodiment, which is configured to reflect infrared EMR. The MLI composite material 100 includes a first thermally-reflective layer 102 spaced from a second thermally-reflective layer 104. A region 106 is located between the first and second thermally-reflective layers 102 and 104, and impedes heat conduction between the first and second thermally-reflective layers 102 and 104. As discussed in further detail below, the first and second thermally-reflective layers 102 and 104 have relatively low emissivities in order to inhibit radiative heat transfer, and the region 106 functions to inhibit conductive and convective heat transfer between the first and second thermally-reflective layers 102 and 104 so that the MLI composite material 100 is thermally insulating.

The first and second thermally-reflective layers 102 and 104 may be spaced from each other using, for example, low thermal conductivity spacers that join the first and second thermally-reflective layers 102 and 104 together, electrostatic repulsion, or magnetic repulsion. For example, electrical potentials may be applied to the first and second thermally-reflective layers 102 and 104 and maintained to provide a controlled electro-static repulsive force, or the first and second thermally-reflective layers 102 and 104 may each include one or more magnetic or electromagnetic elements embedded therein or otherwise associated therewith to provide a magnetic repulsive force.

At least one of the first thermally-reflective layer 102 or the second thermally-reflective layer 104 includes bandgap material that is reflective to infrared EMR over a range of wavelengths. As used herein, the term "bandgap material" means a photonic crystal that exhibits at least one photonic bandgap, a semiconductor material that exhibits an electronic bandgap, or a material that exhibits both an electronic bandgap and at least one photonic bandgap.

Suitable photonic crystals include one-dimensional (e.g., a dielectric stack), two-dimensional, or three-dimensional photonic crystals. Such photonic crystals may be configured to exhibit at least one photonic bandgap so that the photonic crystal reflects (i.e., at least partially blocks) infrared EMR over the range of wavelengths. Such photonic crystals exhibit at least one photonic band gap that has an energy magnitude that is greater than at least part of and, in some embodiments, substantially the entire energy range for the infrared EMR having the range of wavelengths desired to be reflected. That is, at least part of the infrared EMR desired to be reflected falls within the at least one photonic bandgap. In some embodiments, the bandgap material may include an omni-directional, one-dimensional photonic crystal that is reflective to infrared EMR or another selected type of EMR regardless of the wavevector of the incident EMR.

In some embodiments, forming the bandgap material from a photonic crystal enables the MLI composite material 100 to be transparent to at least a part of the visible EMR wavelength spectrum. For example, the photonic crystal may be configured so that the infrared EMR of interest to be reflected falls within the photonic bandgap of the photonic crystal, while at least part of the energy in EMR of the visible EMR wavelength spectrum falls within the photonic conduction band and, thus, may be transmitted therethrough so that the MLI composite material 100 is transparent to at least part of the visible EMR wavelength spectrum.

Suitable semiconductor materials include, but are not limited to, silicon, germanium, silicon-germanium alloys, gallium antimonide, indium arsenide, lead(II) sulfide, lead(II) selenide, lead(II) telluride, or another suitable elemental or compound semiconductor material. Such semiconductor materials exhibit an electronic bandgap having an energy magnitude that is about equal to a magnitude of the energy of the infrared EMR at the upper limit of the range of wavelengths desired to be reflected. That is, the electronic bandgap is sufficiently low (e.g., less than about 1.3 eV) so that the energy of at least the longest wavelength (i.e., lowest energy) infrared EMR desired to be reflected may excite electrons from the valence band to the conduction band of the semiconductor material.

The infrared EMR wavelength spectrum is very broad and is, typically, defined to be about 1 μm to about 1 mm. However, thermal infrared EMR, which is a small portion of the infrared EMR wavelength spectrum, is of most interest to be reflected by the bandgap material to provide an efficient insulation material. In one embodiment, the bandgap material may be reflective to a range of wavelengths of about 1 µm to about 15 µm in the thermal infrared EMR wavelength spectrum. In an embodiment, the bandgap material may be reflective to a range of wavelengths of about 8 µm to about 12 µm in the thermal infrared EMR wavelength spectrum. Consequently, the MLI composite material 100 is reflective to infrared EMR and, particularly, thermal infrared EMR over the range of wavelengths.

Figure 2B:
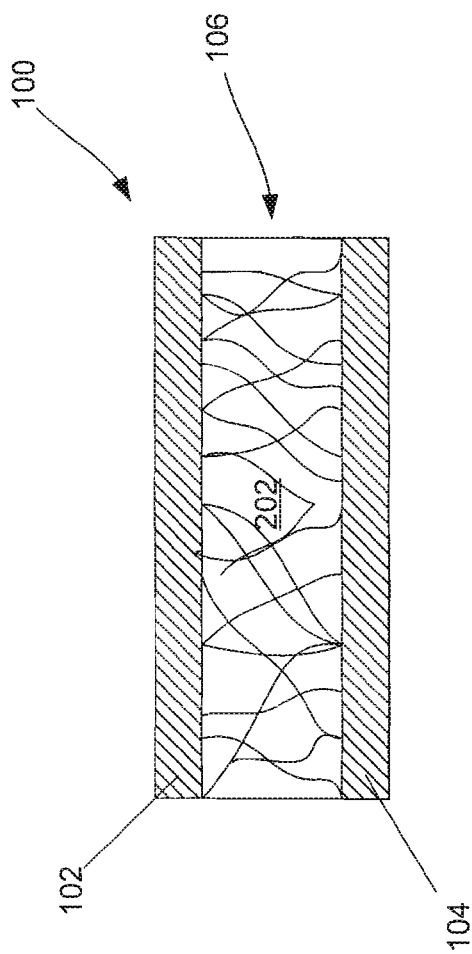
FIG. 2B is a partial cross-sectional view of the MLI composite material shown in FIG. 1, with a region between the first and second thermally-reflective layers including a mass of fibers, according to an embodiment.

As discussed above, the region 106 impedes heat conduction between the first and second thermally-reflective layers 102 and 104. In some embodiments, the region 106 may be at least partially or substantially filled with at least one low-thermal conductivity material. Referring to FIG. 2A, in one embodiment, the region 106 may include a mass 200 of aerogel particles or other type of material that at least partially or substantially fills the region 106. For example, the aerogel particles may comprise silica aerogel particles having a density of about 0.05 to about 0.15 grams per $cm^3$, organic aerogel particles, or other suitable types of aerogel particles. Referring to FIG. 2B, in an embodiment, the region 106 may include a mass 202 of fibers that at least partially or substantially fills the region 106. For example, the mass 202 of fibers or foam may comprise a mass of alumina fibers, a mass of silica fibers, or any other suitable mass of fibers.

In an embodiment, instead of filling the region 106 between the first and second thermally-reflective layers 102 and 104 with a low thermal conductivity material, the region 106 may be at least partially evacuated to reduce heat conduction and convection between the first and second thermally-reflective layers 102 and 104.

Referring to FIG. 2C, according to an embodiment, an MLI composite material 204 may be formed from two or more sections of the MLI composite material 100 to enhance insulation performance. For example, the MLI composite material 204 includes a section 206 made from the MLI composite material 100 assembled with a section 208 that is also made from the MLI composite material 100. Although only two sections of the MLI composite material 100 are shown, other embodiments may include three or more sections of the MLI composite material 100.

Figure 3:
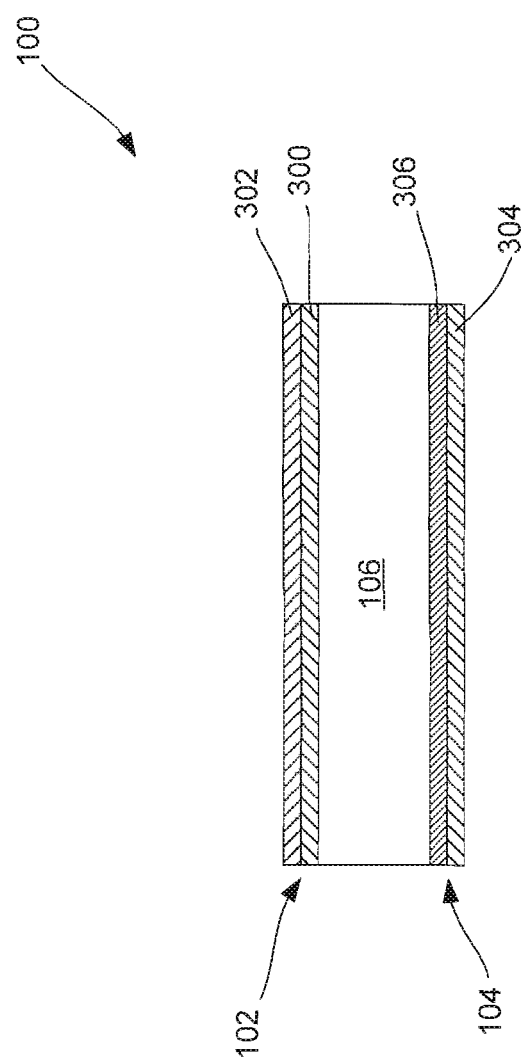
FIG. 3 is a partial cross-sectional view of the MLI composite material shown in FIG. 1 in which the first thermally-reflective layer includes a substrate on which a first bandgap material is disposed and the second thermally-reflective layer includes a substrate on which a second bandgap material is disposed according to an embodiment.

Referring to FIG. 3, in some embodiments, the first and second thermally-reflective layers 102 and 104 may include respective bandgap materials. FIG. 3 is a partial cross-sectional view of the MLI composite material 100 shown in FIG. 1 in which the first thermally-reflective layer 102 includes a substrate 300 on which a first layer of bandgap material 302 is disposed and the second thermally-reflective layer 104 includes a substrate 304 on which a second layer of bandgap material 306 is disposed. The substrates 300 and 304 may each comprise a rigid inorganic substrate (e.g., a silicon substrate) or a flexible, polymeric substrate (e.g., made from Teflon®, Mylar®, Kapton®, etc.). Forming the substrates 300 and 304 from a flexible, polymeric material and forming the first and second layers of bandgap material 302 and 306 sufficiently thin enables the MLI composite material 100 to be sufficiently flexible to be wrapped around a structure as insulation.

The first and second layers of bandgap materials 302 and 306 may be selected from any of the previously described bandgap materials. For example, in one embodiment, the first thermally-reflective layer 102 may be formed by depositing the first layer of bandgap material 302 onto the substrate 300 using a deposition technique, such as chemical vapor deposition (CVD), physical vapor deposition (PVD), or another suitable technique. The second thermally-reflective layer 104 may be formed using the same or similar technique as the first thermally-reflective layer 102.

In some embodiments, the first layer of bandgap material 302 may be reflective to infrared EMR over a first range of wavelengths and the second layer of bandgap material 306 may be reflective to infrared EMR over a second range of wavelengths. In such an embodiment, the MLI composite material 100 may be configured to block infrared EMR over a range of wavelengths that would be difficult to block using a single type of bandgap material.

In some embodiments, the first layer of bandgap material 302 may be reflective to infrared EMR over a first range of wavelengths, and the second layer of bandgap material 306 may be reflective to EMR outside of the infrared EMR spectrum (e.g., EMR in the ultra-violet EMR wavelength spectrum). In other embodiments, the first layer of bandgap material 302 and second layer of bandgap material 306 may be reflective to infrared EMR over the same range of wavelengths.

It is noted that in some embodiments, more than one layer of bandgap material may be disposed on the substrates 300 and 304, respectively. The different layers of bandgap material may be reflective to EMR over different ranges of wavelengths. Furthermore, in some embodiments, the MLI composite material 100 may include one or more additional layers that may be reflective to EMR that falls outside the infrared EMR wavelength spectrum.

Figure 4:
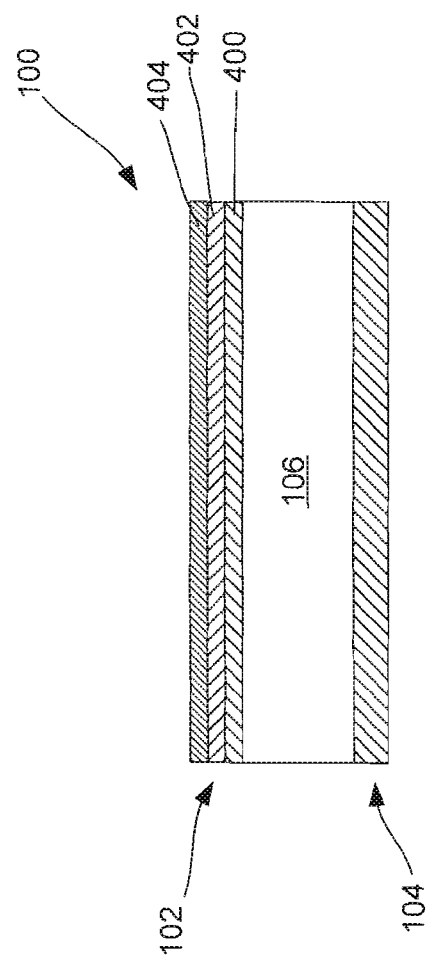
FIG. 4 is a partial cross-sectional view of the MLI composite material shown in FIG. 1 in which the first thermally-reflective layer includes a substrate on which first and second bandgap materials are disposed according to an embodiment.

FIG. 4 is a partial cross-sectional view of the MLI composite material 100 shown in FIG. 1 in which one of the first and second thermally-reflective layers 102 and 104 includes two or more types of different bandgap materials according to an embodiment. For example, in the illustrated embodiment, the first thermally-reflective layer 102 may include a substrate 400 (e.g., a ceramic or polymeric substrate) on which a first layer of bandgap material 402 is deposited (e.g., using CVD, PVD, etc.) and a second layer of bandgap material 404 is deposited (e.g., using CVD, PVD, etc.) onto the first layer of bandgap material 402. The first layer of bandgap material 402 may be reflective to infrared EMR over a first range of wavelengths and the second layer of bandgap material 402 may be reflective to infrared EMR over a second range of wavelengths. The first and second layers of bandgap materials 402 and 404 may be selected from any of the previously described bandgap materials.

In some embodiments, the first layer of bandgap material 402 may be reflective to infrared EMR over a first range of wavelengths, and the second layer of bandgap material 404 may be reflective to EMR outside of the infrared EMR spectrum (e.g., EMR in the ultra-violet EMR wavelength spectrum). In other embodiments, the first layer of bandgap material 402 and second layer of bandgap material 406 may be reflective to infrared EMR over the same range of wavelengths. It is noted that in some embodiments, more than two layers of bandgap material may be disposed on the substrate 400. The different layers of bandgap material may be reflective to EMR over different ranges of wavelengths.

Figure 5:
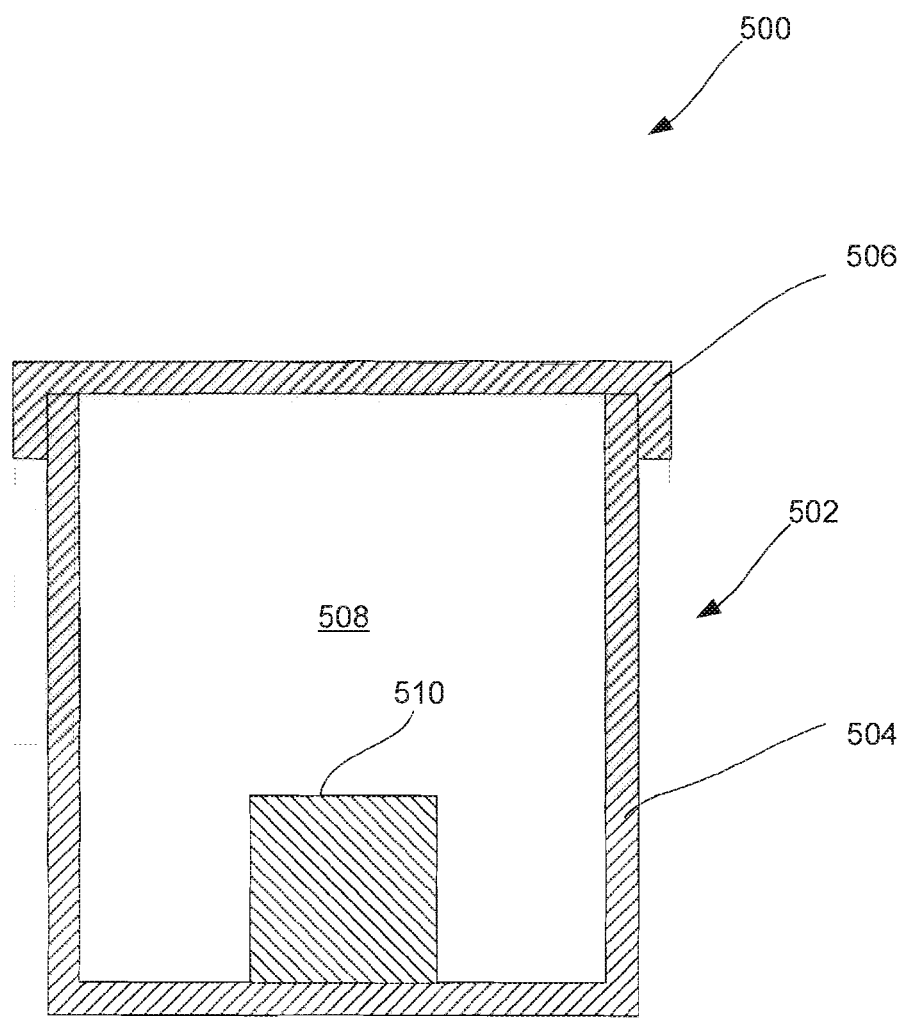
FIG. 5 is a cross-sectional view of an embodiment of storage container including a container structure formed at least partially from MLI composite material.
Figure 6:
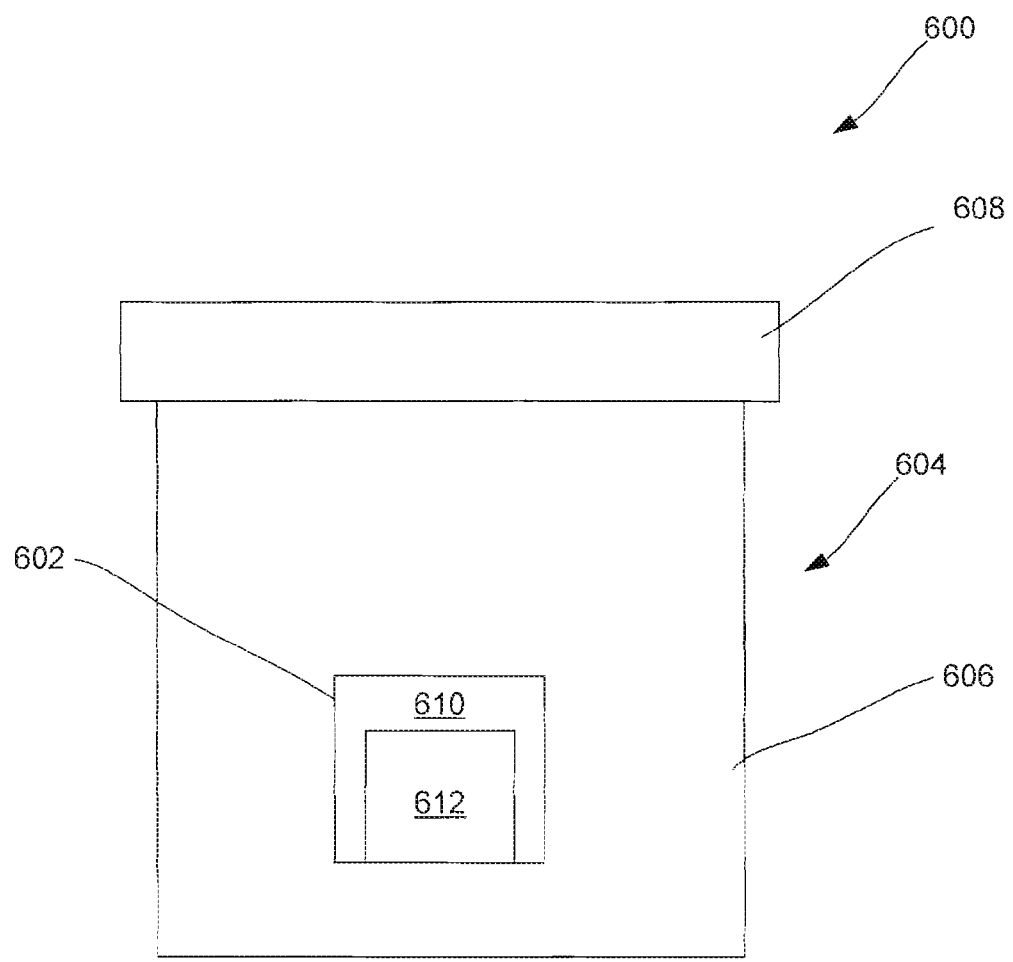
FIG. 6 is a side elevation view of an embodiment of storage container including a container structure having a window fabricated from MLI composite material.
Figure 7:
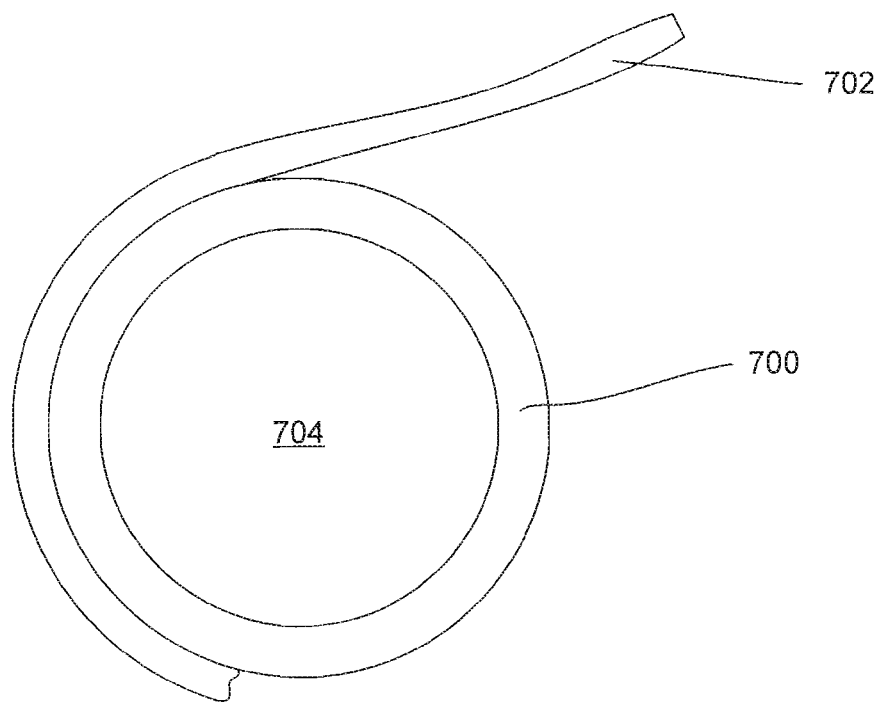
FIG. 7 is a partial side elevation view of a structure in the process of being wrapped with MLI composite material according to an embodiment.

FIGS. 5-7 illustrate various applications of the above-described MLI composite materials for maintaining an object for a period of time at a temperature different than that of the object's surrounding environment. For example, in applications (e.g., cryogenic applications or storing temperature-sensitive medicines), an object may be maintained at a temperature below that of the object's surroundings. In other applications (e.g., reducing heat-loss in piping, etc.), an object may be maintained at a temperature above that of the object's surroundings for a period of time.

FIG. 5 is a cross-sectional view of an embodiment of storage container 500 that employs at least one of the described MLI composite material embodiments. The storage container 500 includes a container structure 502, which may include a receptacle 504 and a lid 506 removably attached to the receptacle 504 that, together, forms a storage chamber 508. At least a portion of the receptacle 504, lid 506, or both may comprise any of the described MLI composite material embodiments. Forming the container structure 502 at least partially or completely from the described MLI composite material embodiments provide a thermally-insulative structure for insulating an object 510 stored in the storage chamber 508 and enclosed by the container structure 502 from incident infrared EMR of the storage container's 500 surrounding environment. In some embodiments, the container structure 502 may be fabricated by assembling sections of MLI composite material together.

In some embodiments, the container structure 502 may include one or more interlocks configured to provide controllable ingress of the object into the storage chamber 508 or egress of the object 510 stored in the storage chamber 508 from the container structure 502. The one or more interlocks may enable inserting the object 510 into the storage chamber 508 or removing the object 510 from the storage chamber 508 without allowing the temperature of the chamber 508 to significantly change. In some embodiments, the container structure 502 may include two or more storage chambers, and the one or more interlocks enable removal an object from one storage chamber without disturbing the contents in another chamber. Similarly, the one or more interlocks may enable insertion of an object into one storage chamber without disturbing the contents of another storage chamber. For example, the one or more interlocks may allow ingress or egress of an object through a network of passageways of the container structure 502, with the one or more interlocks being manually or automatically actuated.

FIG. 6 is a side elevation view of an embodiment of storage container 600 having a window 602 fabricated from an MLI composite material. The storage container 600 may comprise a container structure 604 including a receptacle 606 having the window 602 formed therein and a lid 608. The window 602 may be fabricated from one of the described MLI composite material embodiments, which is reflective to infrared EMR (e.g., over a range of wavelengths), but transparent to other wavelengths in the visible EMR wavelength spectrum. Additionally, in some embodiments, portions of the receptacle 606 other than the window 602 may also be fabricated from at least one of the described MLI composite material embodiments.

As previously described, in such an embodiment, the bandgap material of the MLI composite material may be a photonic crystal configured to be reflective to infrared EMR, but transparent to at least a portion of the visible EMR wavelength spectrum. The window 602 provides visual access to a storage chamber 610 defined by the receptacle 606 and lid 608 in which an object 612 is stored. Thus, the window 602 enables viewing the object 612 therethrough.

FIG. 7 is a partial side elevation view of a structure 700 in the process of being wrapped with flexible MLI composite material 702 according to an embodiment. For example, the flexible MLI composite material 702 may employ a flexible, polymeric substrate on which one or more layers of bandgap material is disposed, such as illustrated in FIGS. 3 and 4. For example, the structure 700 may be configured as a pipe having a passageway 704 therethrough, a cryogenic tank, a container, or any other structure desired to be insulated. The structure 700 may be at least partially or completely enclosed by wrapping the flexible, MLI composite material 702 manually or using an automated, mechanized process.

Figure 8:
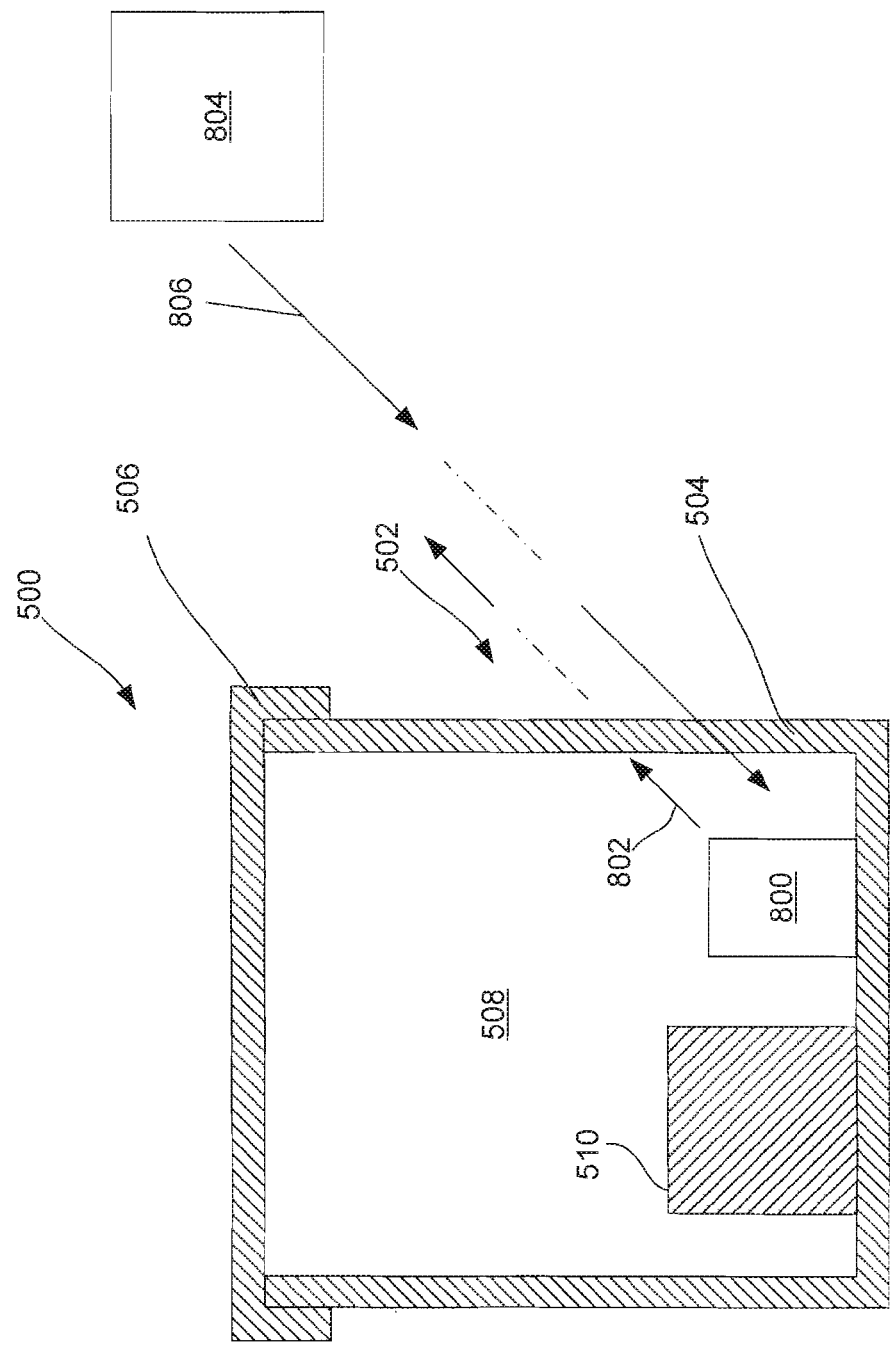
FIG. 8 is a schematic cross-sectional view of a storage container having at least one first device located therein configured to communicate with at least one second device external to the storage container according to an embodiment.

Referring to FIGS. 8 and 9, in some embodiments, the MLI composite material used to form a portion of or substantially all of a container structure of a storage container may be transmissive to radio-frequency EMR. The MLI composite material may be transmissive to radio-frequency EMR having a wavelength of about 0.1 m to about 1000 m and, in some embodiments, about 0.5 m to about 10 m. Therefore, any component (e.g., thermally-reflective layers and substrates) that forms part of the MLI composite material may be transmissive to the radio-frequency EMR. In one embodiment, the bandgap material of the MLI composite material may comprise a photonic crystal that is transmissive to radio-frequency EMR over at least part of the radio-frequency EMR spectrum, while still being reflective to infrared EMR in order to also be thermally insulating. The energy range of the radio-frequency EMR desired to be transmitted through the photonic crystal may have an energy range that falls outside the at least one photonic bandgap of the photonic crystal (i.e., within the photonic valence band). In an embodiment, the bandgap material may be a semiconductor material, and the energy range of the radio-frequency EMR desired to be transmitted through the semiconductor may fall within the electronic bandgap. In such embodiments, at least one first device disposed within the container structure may communicate with at least one second device external to the container structure via one or more radio-frequency EMR signals transmitted through the MLI composite material of the container structure.

FIG. 8 is a schematic cross-sectional view of the storage container 500 having at least one first device 800 operably associated with the storage chamber 508 according to an embodiment. For example, in the illustrated embodiment, the first device 800 is located within the storage chamber 508 along with the object 510 being stored. However, in other embodiments, the first device 800 may be embedded, for example, in the container structure 502 (e.g., the receptacle 504 or lid 506). The first device 800 is configured to communicate via one or more radio-frequency signals 802 (i.e., radio-frequency EMR) with at least one second device 804 that is external to the storage container 500.

In operation, the first device 800 may communicate encoded information about the storage chamber 508 via the one or more radio-frequency signals 802, and the second device 804 may receive the communicated one or more radio-frequency signals 802. For example, the encoded information may include temperature or temperature history of the storage chamber 508, or an identity of the object 510 being stored in the storage chamber 508.

According to one embodiment, the first device 800 may be configured to communicate an identity of the object 510 being stored in the storage chamber 508. For example, the first device 800 may be configured as a radio-frequency identification (RFID) tag that transmits the identity of the object 510 encoded in the one or more radio-frequency signals 802 responsive to being interrogated the second device 804. In such an embodiment, the second device 804 may interrogate the RFID tag via the one or more radio-frequency signals 806 transmitted by the second device 802, through the container structure 502, and to the first device 800. The second device 804 receives the identity of the object 510 communicated from the RFID tag encoded in the one or more radio-frequency signals 802 transmitted through the container structure 502.

According to an embodiment, the second device 804 may receive the one or more radio-frequency signals 802 responsive to transmitting the one or more radio-frequency signals 806. For example, the first device 800 may be configured as a temperature sensor configured to sense a temperature within the storage chamber 508. In such an embodiment, the first device 800 may include memory circuitry (not shown) configured to store a temperature history of the temperature within the storage chamber 508 measured by the temperature sensor. In operation, the second device 804 may transmit one or more radio-frequency signals 806 having information encoded therein (e.g., a request, one or more instructions, etc.) through the container structure 502 and to the first device 800 in order to request and receive the sensed temperature or temperature history from the first device 800 encoded in the one or more radio-frequency signals 802.

According to an embodiment, the second device 804 may transmit the one or more radio-frequency signals 806 responsive to receiving the one or more radio-frequency signals 802. For example, the first device 800 may transmit the one or more radio-frequency signals 802 periodically or continuously to indicate the presence of the storage container 500. The second device 804 may transmit the one or more radio-frequency signals 806 through the container structure 502 and to the first device 800 to, for example, request temperature history of or identity of the object 510 responsive to receiving an indication of the presence of the storage container 500. For example, the one or more radio-frequency signals 802 may encode information about the temperature or temperature history of the storage chamber 508, identity of the object 510, or other information associated with the storage container 500, storage chamber 508, or object 510.

FIG. 9 is a schematic cross-sectional view of the storage container 500 that may include a temperature-control device 902 according to an embodiment. The container structure 502 may include one or more partitions that divide the storage chamber 508 into at least two storage chambers. For example, in the illustrated embodiment, a partition 903 divides the storage chamber 508 into storage chambers 508*a* and 508*b*. The object 510 may be stored in the storage chamber 508*a* and a temperature-control device 902 may be located in the storage chamber 508*b*.

The temperature-control device 902 may include a temperature sensor 907 (e.g., one or more thermal couples) that accesses the storage chamber 508*a* through the partition 903 and is configured to sense the temperature of the object 510. The temperature-control device 902 further includes a heating/cooling device 904 (e.g., one or more Peltier cells) thermally coupled to a heating/cooling element 908 (e.g., a metallic rod) that accesses the storage chamber 508*a* through the partition 903, and is heated or cooled via the heating/cooling device 904. The temperature-control device 902 may also include an actuator 905 operably coupled to the thermal element 908. The temperature-control device 902 further includes a controller 906 operably connected to the temperature sensor 907, heating/cooling device 904, and actuator 905. The actuator 905 is configured to controllably move the thermal element 908 to contact the object 510 responsive to instructions from the controller 906. The temperature-control device 902 may be powered by a battery, a wireless power receiver configured generate electricity responsive to a magnetic field, or another suitable power source.

In one embodiment, the temperature-control device 902 may be configured to heat or cool the object 510 so that the object 510 may be generally stabilized at a selected temperature programmed in or set by the controller 906. In an embodiment, a second device 910 may transmit one or more radio-frequency signals 912 having information encoded therein (e.g., one or more instructions) through the container structure 502 and to the controller 906 of the temperature-control device 902 to direct the temperature-control device 902 to alter a temperature of the object 510 responsive to one or more radio-frequency signals 911 that encode a temperature of the object 510 or storage chamber 508*a*. Responsive to instructions encoded in the one or more radio-frequency signals 912 transmitted from the second device 910, the controller 906 instructs the actuator 905 to move the thermal element 908 to contact the object 510 and heat or cool the thermal element 908 via the heating/cooling device 904 to heat or cool the object 510, as desired or needed.

As described above, in some embodiments, only a portion of the container structure 502 may be formed from the MLI composite material that is transmissive to the radio-frequency signals 912. In one embodiment, the container structure 502 may include suitable markings 914 (e.g., lines, scribe marks, protrusions, etc.) that visually indicate the portion of the container structure 502 made from the MLI composite material (i.e., radio-frequency window) so that a user may direct the one or more radio-frequency signals 912 accurately therethrough to the temperature-control device 902. In the illustrated embodiment, the markings 914 are located on the exterior of the receptacle 504. However, in other embodiments, the markings 914 may be located on the lid 506 depending upon which portion of the container structure 502 is formed from the MLI composite material.

Referring to FIG. 10, the storage container 500 may be employed to store a plurality of molecules 1000, such as a plurality of tagged molecules. For example, the plurality of molecules 1000 may be a temperature-sensitive medicine, a vaccine, or a biological substance. In one embodiment, the MLI composite material may include at least one first type of bandgap material reflective to infrared EMR over a range of wavelengths and at least one second type of bandgap material reflective to EMR that may damage the molecules 1000 (e.g., ultra-violet EMR).

In an embodiment of a method, an excitation source 1002 (e.g., a laser) may be provided that is configured to output excitation EMR 1004 at one or more selected wavelengths chosen to excite the molecules 1000. The excitation source 1002 may output the excitation EMR 1004, which is transmitted through the MLI composite material that forms substantially all or a portion of the container structure 502 to excite the molecular tag of the tagged molecules 1000. Responsive to transmitting the excitation EMR 1004, EMR 1006 emitted by the molecules 1000 due to being excited by the excitation EMR 1004 may be transmitted through the MLI composite material of the container structure 502 and received. The EMR 1006 may be characteristic of the chemistry of the molecules 1000. Thus, the received EMR 1006 emitted by the molecules 1000 may be used to identify the type of molecules 1000 being stored in the storage container 500.

For example, the EMR 1006 may be in the visible wavelength spectrum to which the MLI composite material is transparent, and the color of the EMR 1006 may be received and perceived by a viewer outside of the storage container 500. In other embodiments, a detector (not shown), such as a spectrometer or other suitable analytical instrument, may be provided that receives the EMR 1006 transmitted through the MLI composite material of the container structure 502, and configured to analyze the EMR 1006 to identify the molecules 1000. In such an embodiment, the EMR 1006 may or may not be in the visible EMR wavelength spectrum.

Those having skill in the art will recognize that the state of the art has progressed to the point where there is little distinction left between hardware and software implementations of aspects of systems; the use of hardware or software is generally (but not always, in that in certain contexts the choice between hardware and software can become significant) a design choice representing cost vs. efficiency tradeoffs. Those having skill in the art will appreciate that there are various vehicles by which processes and/or systems and/or other technologies described herein can be effected (e.g., hardware, software, and/or firmware), and that the preferred vehicle will vary with the context in which the processes and/or systems and/or other technologies are deployed. For example, if an implementer determines that speed and accuracy are paramount, the implementer may opt for a mainly hardware and/or firmware vehicle; alternatively, if flexibility is paramount, the implementer may opt for a mainly software implementation; or, yet again alternatively, the implementer may opt for some combination of hardware, software, and/or firmware. Hence, there are several possible vehicles by which the processes and/or devices and/or other technologies described herein may be effected, none of which is inherently superior to the other in that any vehicle to be utilized is a choice dependent upon the context in which the vehicle will be deployed and the specific concerns (e.g., speed, flexibility, or predictability) of the implementer, any of which may vary. Those skilled in the art will recognize that optical aspects of implementations will typically employ optically-oriented hardware, software, and or firmware.

The foregoing detailed description has set forth various embodiments of the devices and/or processes via the use of block diagrams, flowcharts, and/or examples. Insofar as such block diagrams, flowcharts, and/or examples contain one or more functions and/or operations, it will be understood by those within the art that each function and/or operation within such block diagrams, flowcharts, or examples can be implemented, individually and/or collectively, by a wide range of hardware, software, firmware, or virtually any combination thereof. In one embodiment, several portions of the subject matter described herein may be implemented via Application Specific Integrated Circuits (ASICs), Field Programmable Gate Arrays (FPGAs), digital signal processors (DSPs), or other integrated formats. However, those skilled in the art will recognize that some aspects of the embodiments disclosed herein, in whole or in part, can be equivalently implemented in integrated circuits, as one or more computer programs running on one or more computers (e.g., as one or more programs running on one or more computer systems), as one or more programs running on one or more processors (e.g., as one or more programs running on one or more microprocessors), as firmware, or as virtually any combination thereof, and that designing the circuitry and/or writing the code for the software and or firmware would be well within the skill of one of skill in the art in light of this disclosure. In addition, those skilled in the art will appreciate that the mechanisms of the subject matter described herein are capable of being distributed as a program product in a variety of forms, and that an illustrative embodiment of the subject matter described herein applies regardless of the particular type of signal bearing medium used to actually carry out the distribution. Examples of a signal bearing medium include, but are not limited to, the following: a recordable type medium such as a floppy disk, a hard disk drive, a Compact Disc (CD), a Digital Video Disk (DVD), a digital tape, a computer memory, etc.; and a transmission type medium such as a digital and/or an analog communication medium (e.g., a fiber optic cable, a waveguide, a wired communications link, a wireless communication link, etc.).

In a general sense, those skilled in the art will recognize that the various embodiments described herein can be implemented, individually and/or collectively, by various types of electro-mechanical systems having a wide range of electrical components such as hardware, software, firmware, or virtually any combination thereof and a wide range of components that may impart mechanical force or motion such as rigid bodies, spring or torsional bodies, hydraulics, and electromagnetically actuated devices, or virtually any combination thereof. Consequently, as used herein "electro-mechanical system" includes, but is not limited to, electrical circuitry operably coupled with a transducer (e.g., an actuator, a motor, a piezoelectric crystal, etc.), electrical circuitry having at least one discrete electrical circuit, electrical circuitry having at least one integrated circuit, electrical circuitry having at least one application specific integrated circuit, electrical circuitry forming a general purpose computing device configured by a computer program (e.g., a general purpose computer configured by a computer program which at least partially carries out processes and/or devices described herein, or a microprocessor configured by a computer program which at least partially carries out processes and/or devices described herein), electrical circuitry forming a memory device (e.g., forms of random access memory), electrical circuitry forming a communications device (e.g., a modem, communications switch, or optical-electrical equipment), and any non-electrical analog thereto, such as optical or other analogs. Those skilled in the art will also appreciate that examples of electro-mechanical systems include but are not limited to a variety of consumer electronics systems, as well as other systems such as motorized transport systems, factory automation systems, security systems, and communication/computing systems. Those skilled in the art will recognize that electro-mechanical as used herein is not necessarily limited to a system that has both electrical and mechanical actuation except as context may dictate otherwise.

In a general sense, those skilled in the art will recognize that the various aspects described herein which can be implemented, individually and/or collectively, by a wide range of hardware, software, firmware, or any combination thereof can be viewed as being composed of various types of "electrical circuitry." Consequently, as used herein "electrical circuitry" includes, but is not limited to, electrical circuitry having at least one discrete electrical circuit, electrical circuitry having at least one integrated circuit, electrical circuitry having at least one application specific integrated circuit, electrical circuitry forming a general purpose computing device configured by a computer program (e.g., a general purpose computer configured by a computer program which at least partially carries out processes and/or devices described herein, or a microprocessor configured by a computer program which at least partially carries out processes and/or devices described herein), electrical circuitry forming a memory device (e.g., forms of random access memory), and/or electrical circuitry forming a communications device (e.g., a modem, communications switch, or optical-electrical equipment). Those having skill in the art will recognize that the subject matter described herein may be implemented in an analog or digital fashion or some combination thereof.

One skilled in the art will recognize that the herein described components (e.g., steps), devices, and objects and the discussion accompanying them are used as examples for the sake of conceptual clarity and that various configuration modifications are within the skill of those in the art. Consequently, as used herein, the specific exemplars set forth and the accompanying discussion are intended to be representative of their more general classes. In general, use of any specific exemplar herein is also intended to be representative of its class, and the non-inclusion of such specific components (e.g., steps), devices, and objects herein should not be taken as indicating that limitation is desired.

With respect to the use of substantially any plural and/or singular terms herein, those having skill in the art can translate from the plural to the singular and/or from the singular to the plural as is appropriate to the context and/or application. The various singular/plural permutations are not expressly set forth herein for sake of clarity.

The herein described subject matter sometimes illustrates different components contained within, or connected with, different other components. It is to be understood that such depicted architectures are merely exemplary, and that in fact many other architectures can be implemented which achieve the same functionality. In a conceptual sense, any arrangement of components to achieve the same functionality is effectively "associated" such that the desired functionality is achieved. Hence, any two components herein combined to achieve a particular functionality can be seen as "associated with" each other such that the desired functionality is achieved, irrespective of architectures or intermedial components. Likewise, any two components so associated can also be viewed as being "operably connected", or "operably coupled", to each other to achieve the desired functionality, and any two components capable of being so associated can also be viewed as being "operably couplable", to each other to achieve the desired functionality. Specific examples of operably couplable include but are not limited to physically mateable and/or physically interacting components and/or wirelessly interactable and/or wirelessly interacting components and/or logically interacting and/or logically interactable components.

In some instances, one or more components may be referred to herein as "configured to." Those skilled in the art will recognize that "configured to" can generally encompass active-state components and/or inactive-state components and/or standby-state components, etc. unless context requires otherwise.

In some instances, one or more components may be referred to herein as "configured to." Those skilled in the art will recognize that "configured to" can generally encompass active-state components and/or inactive-state components and/or standby-state components, unless context requires otherwise.

While particular aspects of the present subject matter described herein have been shown and described, it will be apparent to those skilled in the art that, based upon the teachings herein, changes and modifications may be made without departing from the subject matter described herein and its broader aspects and, therefore, the appended claims are to encompass within their scope all such changes and modifications as are within the true spirit and scope of the subject matter described herein. Furthermore, it is to be understood that the invention is defined by the appended claims. It will be understood by those within the art that, in general, terms used herein, and especially in the appended claims (e.g., bodies of the appended claims) are generally intended as "open" terms (e.g., the term "including" should be interpreted as "including but not limited to," the term "having" should be interpreted as "having at least," the term "includes" should be interpreted as "includes but is not limited to," etc.). It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to inventions containing only one such recitation, even when the same claim includes the introductory phrases "one or more" or "at least one" and indefinite articles such as "a" or "an" (e.g., "a" and/or "an" should typically be interpreted to mean "at least one" or "one or more"); the same holds true for the use of definite articles used to introduce claim recitations. In addition, even if a specific number of an introduced claim recitation is explicitly recited, those skilled in the art will recognize that such recitation should typically be interpreted to mean at least the recited number (e.g., the bare recitation of "two recitations," without other modifiers, typically means at least two recitations, or two or more recitations). Furthermore, in those instances where a convention analogous to "at least one of A, B, and C, etc." is used, in general such a construction is intended in the sense one having skill in the art would understand the convention (e.g., "a system having at least one of A, B, and C" would include but not be limited to systems that have A alone, B alone, C alone, A and B together, A and C together, B and C together, and/or A, B, and C together, etc.). In those instances where a convention analogous to "at least one of A, B, or C, etc." is used, in general such a construction is intended in the sense one having skill in the art would understand the convention (e.g., "a system having at least one of A, B, or C" would include but not be limited to systems that have A alone, B alone, C alone, A and B together, A and C together, B and C together, and/or A, B, and C together, etc.). It will be further understood by those within the art that virtually any disjunctive word and/or phrase presenting two or more alternative terms, whether in the description, claims, or drawings, should be understood to contemplate the possibilities of including one of the terms, either of the terms, or both terms. For example, the phrase "A or B" will be understood to include the possibilities of "A" or "B" or "A and B."

With respect to the appended claims, those skilled in the art will appreciate that recited operations therein may generally be performed in any order. Examples of such alternate orderings may include overlapping, interleaved, interrupted, reordered, incremental, preparatory, supplemental, simultaneous, reverse, or other variant orderings, unless context dictates otherwise. With respect to context, even terms like "responsive to," "related to," or other past-tense adjectives are generally not intended to exclude such variants, unless context dictates otherwise.

While various aspects and embodiments have been disclosed herein, other aspects and embodiments will be apparent to those skilled in the art. The various aspects and embodiments disclosed herein are for purposes of illustration and are not intended to be limiting, with the true scope and spirit being indicated by the following claims.

The invention claimed is:

1. A method, comprising:
    providing a container structure that at least partially defines at least one storage chamber, the at least one storage chamber including at least one first device positioned therein that is configured to transmit one or more radio-frequency signals, the container structure including,
    one or more accesses to the at least one storage chamber; and
    a multi-layer insulation composite material having a bandgap material that is transmissive to the one or more radio-frequency signals, the multi-layer insulation composite material including, a first thermally-reflective layer;
a second thermally-reflective layer spaced from the first thermally-reflective layer; and
a region between the first and second thermally-reflective layers that limits heat conduction therebetween; and
transmitting the one or more radio-frequency signals from the at least one first device positioned in the at least one storage chamber and through the container structure;
wherein transmitting the one or more radio-frequency signals from the at least one first device positioned in the at least one storage chamber and through the container structure includes transmitting the one or more radio-frequency signals from the at least one first device to at least one second device positioned external to the container structure.

2. The method of claim 1, wherein transmitting the one or more radio-frequency signals from the at least one first device positioned in the at least one storage chamber and through the container structure includes transmitting the one or more radio-frequency signals having information about the at least one storage chamber encoded therein.

3. The method of claim 1, wherein transmitting the one or more radio-frequency signals from the at least one first device positioned in the at least one storage chamber and through the container structure includes transmitting the one or more radio-frequency signals having an identity of an object positioned in the at least one storage chamber encoded therein.

4. The method of claim 1, wherein transmitting the one or more radio-frequency signals from the at least one first device positioned in the at least one storage chamber and through the container structure includes transmitting the one or more radio-frequency signals having temperature-history information about the at least one storage chamber encoded therein.

5. The method of claim 1, wherein transmitting the one or more radio-frequency signals from the at least one first device positioned in the at least one storage chamber and through the container structure includes transmitting the one or more radio-frequency signals responsive to the at least one first device receiving a request from at least one second device positioned external to the container structure.

6. The method of claim 1, wherein the one or more accesses includes at least one of a lid, one or more interlocks configured to provide ingress of an object into the at least one storage chamber, or one or more interlocks configured to provide egress of an object from the at least one storage chamber.

7. A method, comprising:
providing a container structure that at least partially defines at least one storage chamber, the container structure including,
one or more accesses to the at least one storage chamber; and
a multi-layer insulation composite material having a bandgap material that is transmissive to one or more radio-frequency signals, the multi-layer insulation composite material including, a first thermally-reflective layer;
a second thermally-reflective layer spaced from the first thermally-reflective layer; and
a region between the first and second thermally-reflective layers that limits heat conduction therebetween; and
transmitting the one or more radio-frequency signals through the container structure from at least one first device positioned external to the container structure;
wherein the transmitting one or more radio-frequency signals through the container structure from at least one first device positioned external to the container structure includes transmitting the one or more radio-frequency signals from the at least one first device to at least one second device positioned in the at least one storage chamber.

8. The method of claim 7, wherein transmitting the one or more radio-frequency signals through the container structure from at least one first device positioned external to the container structure includes transmitting a request encoded in the one or more radio-frequency signals from the at least one first device to at least one second device positioned in the at least one storage chamber.

9. The method of claim 7, wherein transmitting the one or more radio-frequency signals through the container structure from at least one first device positioned external to the container structure includes transmitting one or more instructions encoded in the one or more radio-frequency signals from the at least one first device to at least one second device positioned in the at least one storage chamber.

10. The method of claim 7, wherein transmitting the one or more radio-frequency signals through the container structure from at least one first device positioned external to the container structure includes transmitting information encoded in the one or more radio-frequency signals from the at least one first device to at least one second device positioned in the at least one storage chamber.

11. The method of claim 7, wherein transmitting the one or more radio-frequency signals through the container structure from at least one first device positioned external to the container structure includes directing an at least one second device to alter a temperature of the at least one storage chamber.

12. The method of claim 11, wherein directing the at least one first device to alter a temperature of the at least one storage chamber includes lowering the temperature of the at least one storage chamber.

13. The method of claim 11, wherein directing the at least one first device to alter a temperature of the at least one storage chamber includes increasing the temperature of the at least one storage chamber.

14. The method of claim 7, wherein transmitting the one or more radio-frequency signals through the container structure from at least one first device positioned external to the container structure includes transmitting the one or more radio-frequency signals from the at least one first device to at least one second device positioned in the at least one storage chamber responsive to the at least one first device receiving information from the at least one second device associated with the at least one storage chamber.

15. The method of claim 7, wherein transmitting the one or more radio-frequency signals through the container structure from at least one first device positioned external to the container structure includes directing the one or more radio-frequency signals at a radio-frequency window of the container structure.

16. A method, comprising:
providing a container structure that at least partially defines at least one storage chamber, the container structure including,
one or more accesses to the at least one storage chamber; and a multi-layer insulation composite material having a bandgap material that is transmissive to one or more radio-frequency signals, the multi-layer insulation composite material including,
a first thermally-reflective layer;
a second thermally-reflective layer spaced from the first thermally-reflective layer; and
a region between the first and second thermally-reflective layers that limits heat conduction therebetween; and receiving the one or more radio-frequency signals transmitted through the container structure and from at least one first device positioned external to the container structure;

wherein receiving the one or more radio-frequency signals transmitted through the container structure and from at least one first device positioned external to the container structure includes receiving the one or more radio-frequency signals using at least one second device positioned in the at least one storage chamber.

17. The method of claim 16, wherein receiving the one or more radio-frequency signals transmitted through the container structure and from at least one first device positioned external to the container structure includes receiving the one or more radio-frequency signals that direct at least one second device positioned in the at least one storage chamber to alter a temperature of the at least one storage chamber.

18. The method of claim 17, wherein receiving the one or more radio-frequency signals that direct at least one second device positioned in the at least one storage chamber to alter a temperature of the at least one storage chamber includes receiving the one or more radio-frequency signals that direct the at least one second device to increase the temperature.

19. The method of claim 17, wherein receiving the one or more radio-frequency signals that direct at least one second device positioned in the at least one storage chamber to alter a temperature of the at least one storage chamber includes receiving the one or more radio-frequency signals that direct the at least one second device to decrease the temperature.

20. The method of claim 16, wherein receiving the one or more radio-frequency signals transmitted through the container structure and from at least one first device positioned external to the container structure includes receiving a request from the at least one first device.

21. The method of claim 16, wherein receiving the one or more radio-frequency signals transmitted through the container structure and from at least one first device positioned external to the container structure includes receiving one or more instructions from the at least one first device.

22. The method of claim 16, wherein receiving the one or more radio-frequency signals transmitted through the container structure and from at least one first device positioned external to the container structure includes receiving information from the at least one first device.

23. A method, comprising:
providing a container structure that at least partially defines at least one storage chamber, the at least one storage chamber including at least one first device positioned therein that is configured to transmit one or more radio-frequency signals, the container structure including, one or more accesses to the at least one storage chamber; and
a multi-layer insulation composite material having a band-gap material that is transmissive to the one or more radio-frequency signals, the multi-layer insulation composite material including,
a first thermally-reflective layer;
a second thermally-reflective layer spaced form the first thermally-reflective layer; and
a region between the first and second thermally-reflective layers that limits heat conduction therebetween; and
receiving the one or more radio-frequency signals transmitted through the container structure from the at least one first device positioned in the at least one storage chamber;
wherein receiving the one or more radio-frequency signals transmitted through the container structure from the at least one first device positioned in the at least one storage chamber includes receiving the one or more radio-frequency signals using at least one second device positioned external to the container structure.

24. The method of claim 23, wherein receiving the one or more radio-frequency signals transmitted through the container structure from the at least one first device positioned in the at least one storage chamber includes receiving the one or more radio-frequency signals that encode information associated with the at least one storage chamber.

25. The method of claim 23, wherein receiving the one or more radio-frequency signals transmitted through the container structure from the at least one first device positioned in the at least one storage chamber includes receiving the one or more radio-frequency signals having an identity of an object positioned in the at least one storage chamber encoded therein.

26. The method of claim 23, wherein receiving the one or more radio-frequency signals transmitted through the container structure from the at least one first device positioned in the at least one storage chamber includes receiving the one or more radio-frequency signals having temperature information about the at least one storage chamber encoded therein.

27. The method of claim 23, wherein receiving the one or more radio-frequency signals transmitted through the container structure from the at least one first device positioned in the at least one storage chamber includes receiving the one or more radio-frequency signals having temperature-history information about the at least one storage chamber encoded therein.

28. The method of claim 23, wherein receiving the one or more radio-frequency signals transmitted through the container structure from the at least one first device positioned in the at least one storage chamber includes receiving the one or more radio-frequency signals with at least one second device positioned external to the container structure responsive to transmitting a request from the at least one second device.

* * * * *